United States Patent [19]
Shiomi

[11] Patent Number: 5,873,004
[45] Date of Patent: Feb. 16, 1999

[54] IMAGE STABILIZING APPARATUS

[75] Inventor: Yasuhiko Shiomi, Kawaguchi, Japan

[73] Assignee: Canon Kabushiki Kaisha, Tokyo, Japan

[21] Appl. No.: 820,030

[22] Filed: Mar. 19, 1997

Related U.S. Application Data

[63] Continuation of Ser. No. 355,322, Dec. 12, 1994, abandoned, which is a continuation of Ser. No. 940,392, Sep. 3, 1992, abandoned.

[30] Foreign Application Priority Data

| Sep. 6, 1991 | [JP] | Japan | 3-254241 |
| Sep. 6, 1991 | [JP] | Japan | 3-254242 |
| Sep. 6, 1991 | [JP] | Japan | 3-254246 |

[51] Int. Cl.$^6$ ............................................. G03B 17/00
[52] U.S. Cl. ................................. 396/52; 348/208
[58] Field of Search ................... 396/52, 55; 348/208

[56] References Cited

U.S. PATENT DOCUMENTS

| 5,012,270 | 4/1991 | Sekine et al. | 354/430 |
| 5,101,230 | 3/1992 | Shikaumi et al. | 354/430 |
| 5,166,723 | 11/1992 | Yoshida et al. | 354/430 |
| 5,170,255 | 12/1992 | Yamada et al. | 358/222 |
| 5,175,580 | 12/1992 | Shiomi | 354/430 |

*Primary Examiner*—Russell E. Adams
*Attorney, Agent, or Firm*—Fitzpatrick, Cella Harper & Scinto

[57] ABSTRACT

An image stabilizing apparatus is provided with a plurality of gain setting means arranged in a feedback loop system, a gain switching means for, when an oscillation of the feedback loop system is detected based on an output from a deviation amount detection means, switching gains in the gain setting means, a plurality of phase compensation means arranged in the feedback loop system, and a phase compensation switching means for, when an oscillation of the feedback loop system is detected based on an output from the deviation amount detection means, switching the phase compensation means. The oscillation is suppressed by switching the gains in the gain setting means, switching the phase compensation means, or simultaneously switching them.

39 Claims, 19 Drawing Sheets

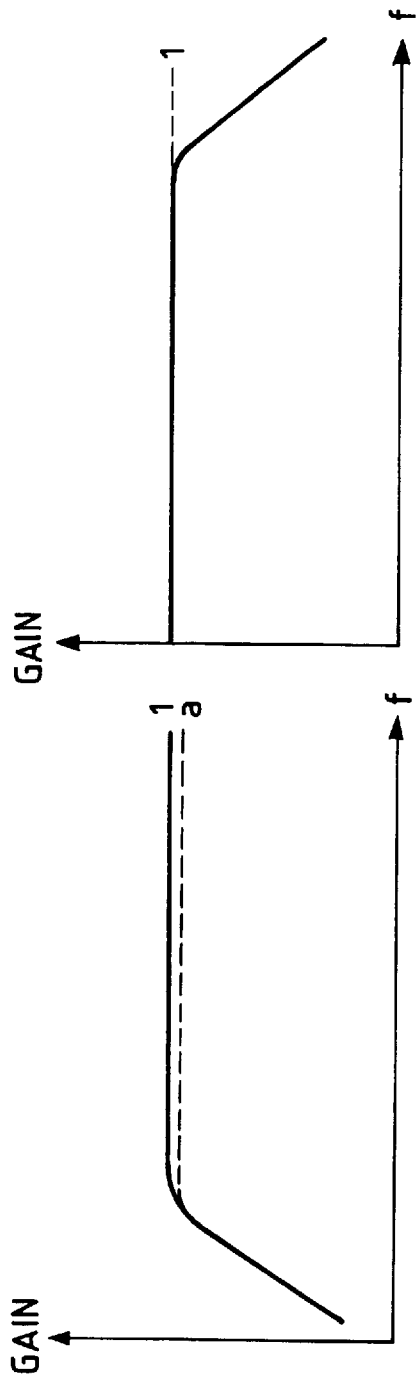
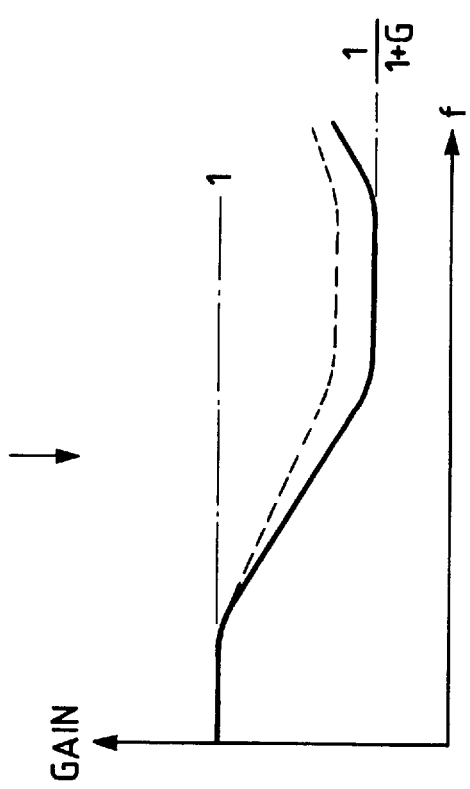
FIG. 5A
FIG. 5B
FIG. 5C

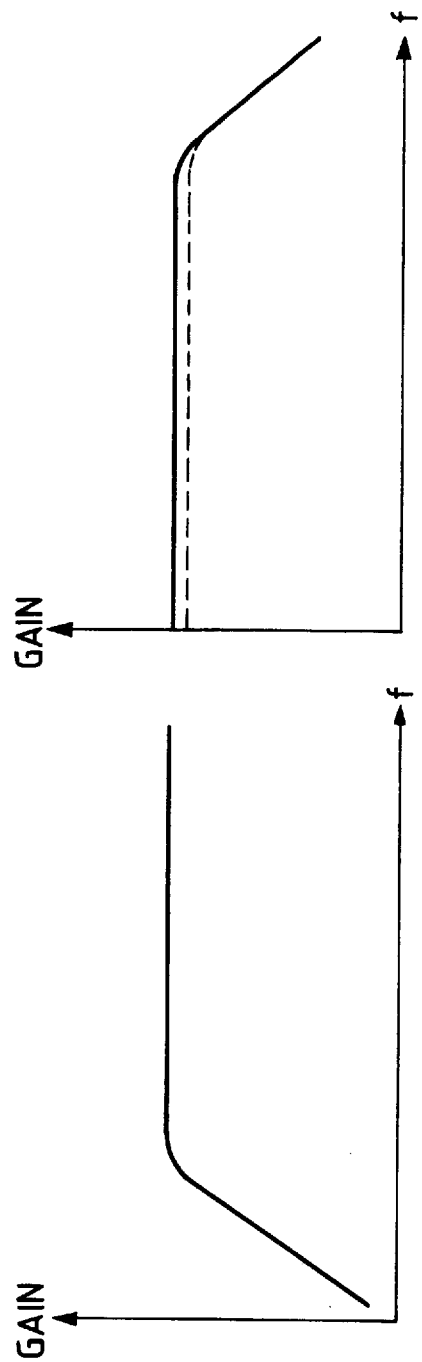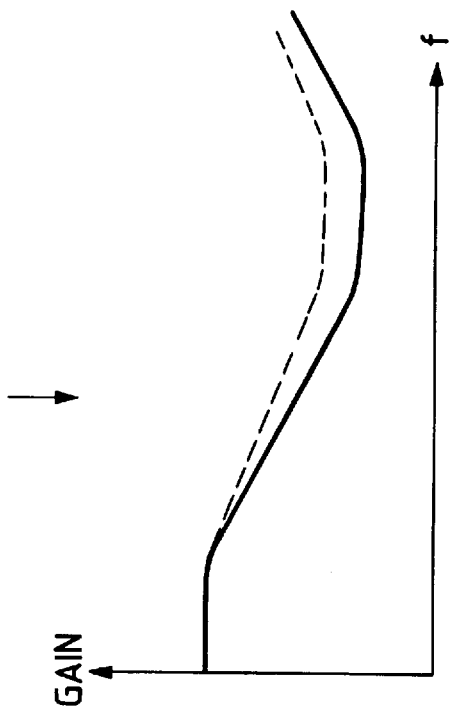
FIG. 7A
FIG. 7B
FIG. 7C

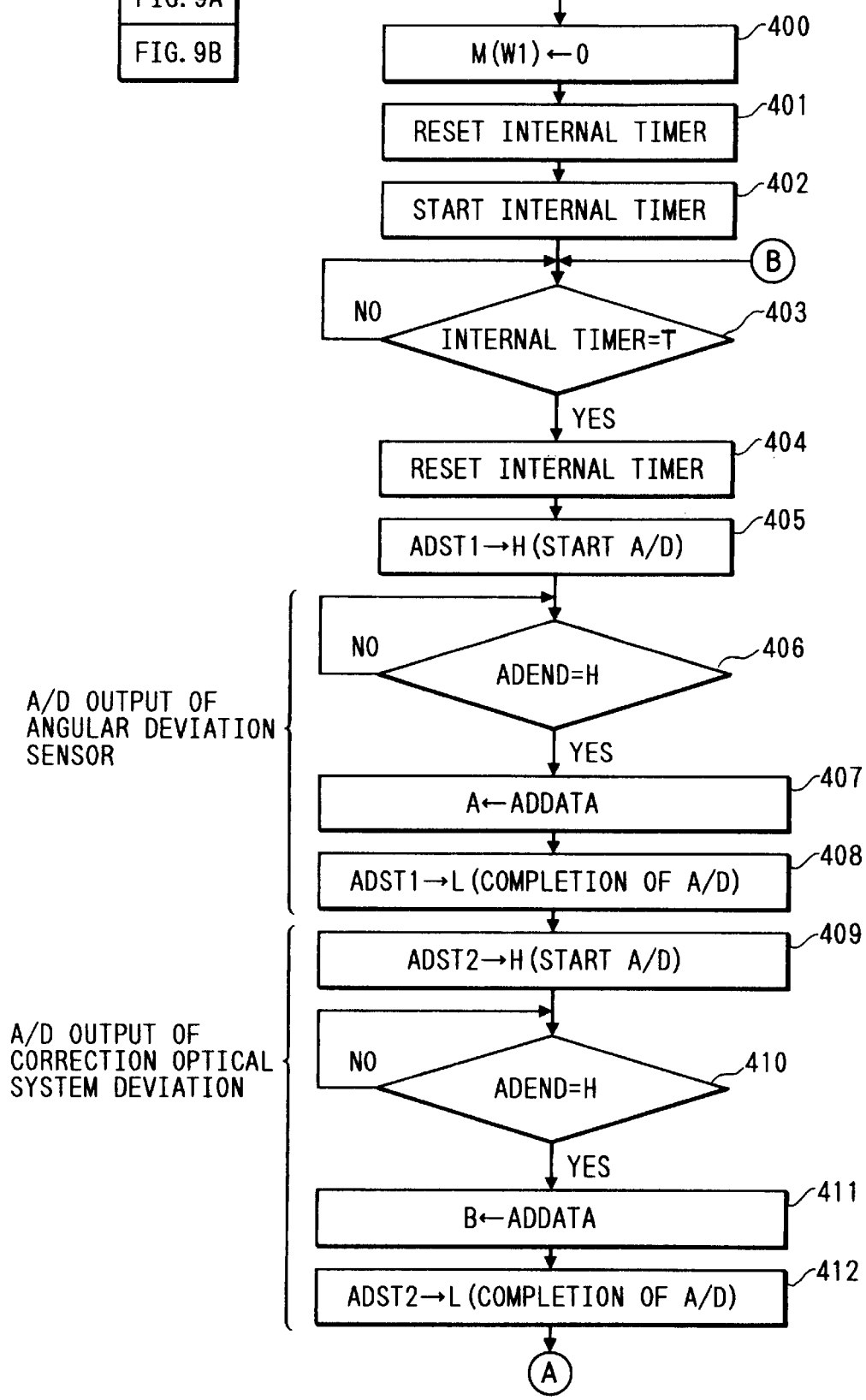

$$H(S) = \frac{V_{OUT}}{V_{IN}} = \frac{SC_1R_1}{1+SC_1R_1}$$

$$H(Z) = \frac{\dfrac{\frac{2}{T_1}}{\frac{1}{C_1R_1}+\frac{2}{T_1}} + \dfrac{\frac{-2}{T_1}}{\frac{1}{C_1R_1}+\frac{2}{T_1}}Z^{-1}}{1 + \dfrac{\frac{1}{C_1R_1}-\frac{2}{T_1}}{\frac{1}{C_1R_1}+\frac{2}{T_1}}Z^{-1}}$$

($T_1$: SAMPLING TIME)

$$H(S) = \frac{V_{OUT}}{V_{IN}} = \frac{1}{1+SC_2R_2}$$

$$H(Z) = \frac{\dfrac{\frac{1}{C_2R_2}}{\frac{1}{C_2R_2}+\frac{2}{T_1}} + \dfrac{\frac{1}{C_2R_2}}{\frac{1}{C_2R_2}+\frac{2}{T_1}}Z^{-1}}{1 + \dfrac{\frac{1}{C_2R_2}-\frac{2}{T_1}}{\frac{1}{C_2R_2}+\frac{2}{T_1}}Z^{-1}}$$

($T_1$: SAMPLING TIME)

IMAGE STABILIZING APPARATUS

This application is a continuation of application Ser. No. 08/355,322 filed Dec. 12, 1994, which is a continuation of application Ser. No. 07/940,392 filed Sep. 3, 1992, both now abandoned.

BACKGROUND OF THE INVENTION

1. Field of the Invention

The present invention relates to an image stabilizing apparatus comprising a vibration detection means for detecting a vibration deviation amount with respect to an absolute space, an optical correction means for varying an optical path incident on a photographing lens with respect to the optical axis, and a control means for driving the optical correction means according to the output from the vibration detection means.

2. Related Background Art

In a conventional image stabilizing apparatus of this type, an angular deviation sensor shown in FIG. 19 is used.

In FIG. 19, in a case 301 in which a liquid 300 having a predetermined specific gravity is sealed, a float 302 having the same specific gravity as that of the liquid 300 is placed in a state wherein the float 302 is supported to be rotatable about a rotating shaft 303. The float 302 comprises a permanent magnet which is magnetized in a direction of an arrow a in FIG. 19, and forms a closed magnetic circuit with a yoke 304. A coil 305 is arranged between the float 302 and the yoke 304. When a current flows through the coil 305, since a force based on the Fleming's left-hand rule acts on the float 302, the float 302 is electrically controlled by the force.

In this state, if the case 301 which is moved integrally with a camera main body is rotated by "$\theta_{IN}$" with respect to the absolute space by a camera shake or vibration, the float 302 maintains a static state with respect to the absolute space by the inertia of the liquid 300. For this reason, the float 302 is rotated by about "$\theta^{IN}$" relative to the case 301. Therefore, the movement of the float 302 can be detected by an optical means which is moved integrally with the case 301 and includes an infrared light-emitting element (to be referred to as an iRED hereinafter) 306 and a semiconductor position detector (to be referred to as a PSD hereinafter) 307.

On the other hand, as a correction means for removing an image blur actually passing through a photographing lens on the basis of the output from the angular deviation sensor, a variable vertical angle prism sealed with a liquid 400 having a predetermined refractive index, as shown in FIG. 20A, is used.

In FIG. 20A, in the variable vertical angle prism, the internal transparent liquid 400 is sandwiched between two transparent plates 402, the outer surfaces are sealed by a resin film 403, and the entire structure is clamped by a frame body 404. The transparent plates 402 are respectively rotatable about rotating shafts 401a and 401b.

In FIG. 20A, light emitted from a point O on an object plane passes through the above-mentioned variable vertical angle prism and a photographing lens L, and forms an image on a film surface of a camera. If the camera is rotated by "$\theta$" with respect to the absolute space by a camera vibration of a photographer, and the point O on the object plane is relatively shifted to a position O', an image F on the film surface is moved to a position F'. In FIG. 20A, since the variable vertical angle prism is not moved at all, no correction is performed for the above-mentioned image blur.

In FIG. 20B, the transparent plate 402 near the photographing lens L of the variable vertical angle prism is inclined from a parallel position by an angle $\delta$ about the rotating shaft 401a. If the refractive index of the internal liquid 400 is represented by n, light from the point O' is deflected by "$\theta'$" by the variable vertical angle prism so as to satisfy:

$$\theta'=(n-1)\delta$$

Therefore, if "$\theta=\theta'$", an image is formed at the same image position as that free from any camera vibration.

Therefore, when the vibration deviation $\theta_{IN}$ of a photographer is detected by the angular deviation sensor, and feedback control is made so that the output from the sensor is always equal to the correction angle $\theta$ of the variable vertical angle prism in the optical axis direction, image stabilizing control can be performed without being influenced by a disturbance (e.g., a friction about the rotating shaft of the variable vertical angle prism).

However, in the conventional control method of the apparatus, feedback control must be executed while actually detecting the movement of the variable vertical angle prism so as to reduce the influence of, e.g., a disturbance. For this reason, the open frequency characteristics of the feedback loop considerably change due to a drift of a power supply voltage (which may change the loop gain depending on a method of, e.g., a driver), a change in temperature (which may change the viscosity of the liquid in the case of the variable vertical angle prism), and the like. In this state, the entire system may oscillate.

In the conventional apparatus, feedback control of the entire system is made so that the output value from the vibration detection means becomes equal to the output value indicating the moving amount of the correction optical system (optical correction means) provided to the photographing optical system. When the moving amount of the optical correction means is set in advance at a level necessary for correcting an actual camera vibration per unit angle, an image on the film surface passing through the photographing optical system can always be formed at the same point by the above-mentioned feedback control operation in an ideal state even when the camera main body vibrates. However, in practice, the output value per unit angle from the vibration detection means and the output value per unit correction angle from the optical correction means are not always constant due to variations of the mounting precision of a position detection sensor such as a PSD, the precision of a detection circuit, and the like. Thus, the stability of the image on the film surface is considerably impaired as compared to the ideal state.

Furthermore, according to the arrangement of the angular deviation sensor of the conventional apparatus, as the characteristics of the sensor are expanded to the lower frequency side, a force (a so-called spring force) for returning the float 302 (FIG. 19) to a reference position with respect to the case 301 must be weakened. In general, the liquid in the sensor has substantially the same specific gravity as that of the float 302. However, in practice, a specific gravity error is slightly included, and the float 302 itself is difficult to have a completely symmetrical shape due to its dimensional precision. For this reason, the float 302 is influenced by gravity. If a force actually acting on the float 302 by gravity is represented by mg, and a spring constant as a spring force for returning the sensor to the reference position is represented by K, an angular deviation given by "$\theta=mg/k$" appears as a steady difference. When this value is extremely increased, light reflected by the float 302 to detect the position of the float 302 relative to the case 301 falls outside the PSD 307, and detection is undesirably disabled.

SUMMARY OF THE INVENTION

One aspect of the invention is to arrange a plurality of gain setting means arranged in a feedback loop system, a gain switching means for, when an oscillation of the feedback loop system is detected based on an output from a deviation amount detection means, switching gains in the gain setting means, a plurality of phase compensation means arranged in the feedback loop system, and a phase compensation switching means for, when an oscillation of the feedback loop system is detected based on an output from the deviation amount detection means, switching the phase compensation means. The oscillation is suppressed by switching the gains in the gain setting means, switching the phase compensation means, or simultaneously switching them.

One aspect of the invention is to arrange an adjusting means for externally setting an output from a vibration detection means to be an arbitrary amplitude rate, or to arrange an adjusting means for externally setting an output from an absolute position detection means of an image stabilizing means to be an arbitrary amplitude rate. The output from the vibration detection means or the absolute position detection means of the image stabilizing means is corrected by the adjusting means, so that the sensitivity levels of these means can maintain a predetermined proportionality relationship.

One aspect of the invention is to arrange a gain setting means for setting a plurality of gains with respect to an output from a calculation means, a driver means for supplying an energization current to a coil according to the output values from the gain setting means, a storage means for storing the outputs from the gain setting means, and a control means for increasing the setting gains of the gain setting means for a predetermined period of time and storing the increased output levels at that time in the storage means, and for, after an elapse of the predetermined period of time, decreasing the setting gains of the gain setting means, and simultaneously causing the storage means to output the stored output levels to the driver means. The setting gains of the gain setting means are increased for the predetermined period of time, and the output levels at that time are stored in the storage means. After an elapse of the predetermined period of time, the setting gains of the gain setting means are decreased, and at the same time, the output levels stored in the storage means are output to the driver means in addition to the output values of the gain setting means. Thus, an offset caused by a mechanical unbalance in an angular deviation sensor is electrically canceled, thereby improving the rising characteristics of the angular deviation sensor.

BRIEF DESCRIPTION OF THE DRAWINGS

FIGS. 5A to 5C are graphs showing the characteristics of an angular deviation sensor, a correction optical system, and an image blur suppression on a film surface, plotted on the frequency axis in FIG. 4;

FIGS. 7A to 7C are graphs showing the characteristics of an angular deviation sensor, a correction optical system, and an image blur suppression on a film surface, plotted on the frequency axis in FIG. 6;

DETAILED DESCRIPTION OF THE PREFERRED EMBODIMENTS

Figure 1:
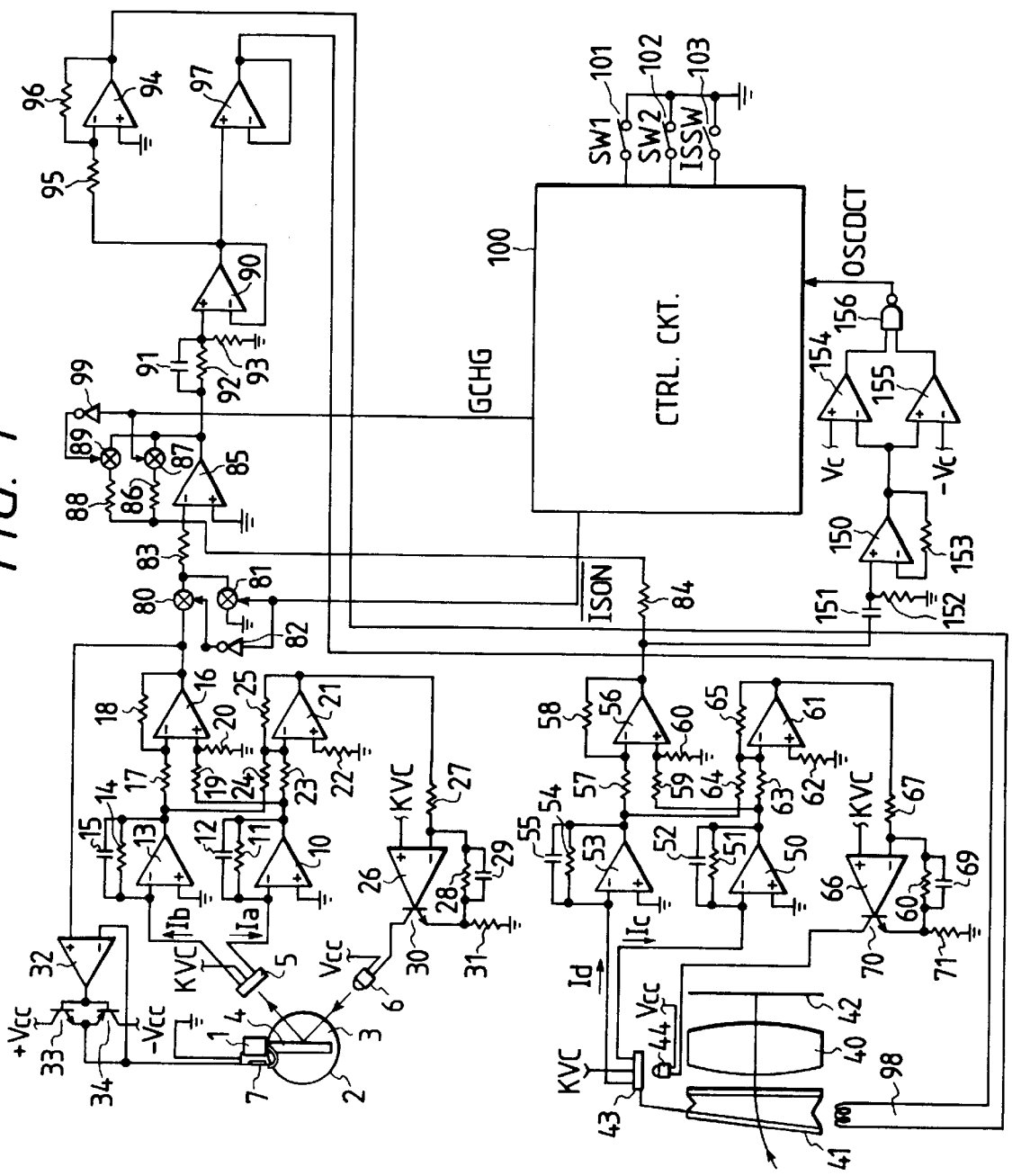
FIG. 1 is a circuit diagram showing an image stabilizing apparatus for a camera according to the first embodiment of the present invention.

FIG. 1 is a circuit diagram showing an image stabilizing apparatus for a camera according to the first embodiment of the present invention.

As has been described in the prior art, when a case 2 which is moved integrally with a camera is rotated with respect to the absolute space due to the influence of a camera vibration, since a float 4 inside the case 2 maintains a static state with respect to the absolute space by the inertia of a liquid 3, the float 4 is rotated relative to the case 2. The relative deviation can be optically detected by an iRED 6 and a PSD 5, which are rotated integrally with the camera. Signal light emitted from the iRED 6 is reflected by the surface of the float 4, and is incident on the PSD 5. In this case, since the incident position of the reflected signal light onto the PSD 5 changes in accordance with the relative angle between the float 4 and the case 2, output currents Ia and Ib from the PSD 5 proportionally change according to the rotational angle of the float 4.

The output currents Ia and Ib are respectively amplified by a current-voltage conversion circuit constituted by an operational amplifier 10, a resistor 11, and a capacitor 12, and a current-voltage conversion circuit constituted by an operational amplifier 13, a resistor 14, and a capacitor 15. The outputs from these conversion circuits are respectively input to an adder circuit constituted by an operational amplifier 21, and resistors 22, 23, 24, and 25, and a subtracter circuit constituted by an operational amplifier 16, and resistors 17, 18, 19, and 20. The output from the adder circuit is input to an iRED driver circuit constituted by an operational amplifier 26, resistors 27, 28, and 31, a capacitor 29, and a transistor 30, and light amount feedback control is executed so that the output from the adder circuit becomes always equal to a reference voltage KVC.

On the other hand, the vertical-angle deviation of a variable vertical angle prism 41 used in a correction optical system of this embodiment is detected in the same manner as in the angular deviation sensor.

More specifically, a slit interlocked with the movement of the variable vertical angle prism is provided between an iRED 44 and a PSD 43, and the PSD 43 generates photocurrents Ic and Id according to the movement of the slit. The photocurrents Ic and Id are respectively amplified by a current-voltage conversion circuit constituted by an operational amplifier 50, a resistor 51, and a capacitor 52, and a current-voltage conversion circuit constituted by an operational amplifier 53, a resistor 54, and a capacitor 55. The outputs from these conversion circuits are respectively input to a subtracter circuit constituted by an operational amplifier 56, and resistors 57, 58, 59, and 60, and an adder circuit constituted by an operational amplifier 61, and resistors 62, 63, 64, and 65. Since the output from the adder circuit is input to an iRED driver circuit constituted by an operational amplifier 66, resistors 67, 68, and 71, a capacitor 69, and a transistor 70, the output from the adder circuit becomes always equal to the reference potential KVC.

As described above, since the total sums of the photocurrents output from the PSDs 5 and 43 are always constant, the outputs from the subtracter circuits represent an angular deviation with respect to the absolute space, and a vertical-angle deviation of the variable vertical angle prism.

Since the output from the operational amplifier 16 is input to a coil driver circuit constituted by an operational amplifier 32, and transistors 33 and 34, an energization current to a coil 7 is determined according to the output of the operational amplifier 16. As has been described in the prior art, when a current is supplied to the coil 7 placed in a closed magnetic circuit constituted by a yoke 1 and the float 4, since a force based on the Fleming's left-hand rule is generated, the movement of the float and characteristics of the angular deviation sensor itself can be controlled by controlling this current.

The output from the operational amplifier 16 is connected to a resistor 83 through an analog switch 80, and the output from the operational amplifier 56 is connected to a resistor 84. These resistors are connected to the inverting input terminal of an operational amplifier 85. Resistor 86 and analog switch 87, and resistor 88 and analog switch 89 are respectively connected to the feedback system in parallel.

The output from the operational amplifier 85 is input to a phase compensation circuit constituted by an operational amplifier 90, resistors 92 and 93, and a capacitor 91, thereby performing phase compensation of the entire feedback system. Furthermore, the output from the phase compensation circuit is input to a buffer circuit constituted by an operational amplifier 97, and an inverting amplifier circuit constituted by an operational amplifier 94, and resistors 95 and 96, so that a coil 98 is bidirectionally energized by the outputs from these amplifiers.

As described above, if the analog switch 80 is ON, feedback control is executed, so that the output from the angular deviation sensor becomes always equal to the deviation angle output of the variable vertical angle prism. Therefore, when the gains of the output per unit angle of the angular deviation sensor and the output of the variable vertical angle prism per unit correction angle with respect to the optical axis are set using the resistors 83, 84, and the like, so that they are equal to each other, the image stabilizing operation with respect to a camera vibration can be controlled by the above-mentioned system.

A control method for maintaining stability of the feedback loop system as well as control from a control circuit 100 will be described below.

The control circuit 100 shown in FIG. 1 receives the outputs from a switch 101 (SW1) and a switch 102 (SW2), which are interlocked with a release operation of the camera, and the output from a switch 103 (ISSW) for selecting whether the image stabilizing operation is to be executed so as to read the states of these switches.

Normally, when the switch SW1 is turned on in a state wherein the switch ISSW is kept ON, the control circuit 100 detects this, and immediately sets an output $\overline{\text{ISON}}$ at L (low) level. Thus, an analog switch 81 is turned off, and the analog switch 80 is turned on by the output from an inverter 82. As described above, the output from the angular deviation sensor serves as a reference input to the feedback control system including the above-mentioned variable vertical angle prism, and the image stabilizing operation is started.

As described above, the output from the operational amplifier 56 represents the actual vertical-angle deviation of the variable vertical angle prism, and substantially the same waveform as that of a camera vibration is output during the image stabilizing operation.

In this case, the frequency band of an actual camera vibration is as low as a maximum of 20 to 30 Hz, while the feedback loop system including the variable vertical angle prism is set to have a gain crossover frequency near several hundreds of Hz so as to sufficiently eliminate the influence of, e.g., friction. For this reason, the time constant of a differential circuit constituted by an operational amplifier 150, a capacitor 151, and resistors 152 and 153 is determined to cut the frequency band of the camera vibration. Therefore, when the state of the feedback loop system changes, and an oscillation occurs, a frequency near the gain crossover frequency is observed, and is output from the operational amplifier 150. The output from the operational amplifier 150 is compared by a window comparator constituted by comparators 154 and 155 and a NAND gate 156 so as to check whether the output amplitude of the operational amplifier 150 falls within a range between a positive reference voltage VC and a negative reference voltage –VC.

When the oscillation amplitude of the feedback loop system exceeds the reference voltage VC or is decreased below –VC, an output OSCDCT from the window comparator goes to H (high) level. Upon detection of this H-level output, the control circuit 100 immediately sets an output GCHG at H level. The analog switch 87 is turned on by the H-level output GCHG, and the analog switch 89 is turned off by the output from an inverter 99. Therefore, the resistor 86 is selected as a feedback resistor of the operational amplifier 85. Since the resistance of the resistor 86 is smaller than that of the resistor 88, the feedback loop gain is consequently decreased, and the oscillation of the feedback loop system can be stopped or can be suppressed to a level low enough not to influence the entire system.

Furthermore, in order to more finely change the loop gain of this system over a wider range, the number of resistors may be increased, or the resistors in the feedback loop of the operational amplifier 85 may comprise voltage-controlled variable resistors such as MOS resistors, and their resistances may be changed by a D/A converter (not shown) provided to the control circuit 100.

In this embodiment, the oscillation state of the feedback system is checked during the image stabilizing control operation. Even when the output $\overline{\text{ISON}}$ is at H level, i.e., even when the output from the angular deviation sensor is not connected to the feedback loop, the feedback loop characteristics are basically left unchanged. For this reason, the stabilization state of the system can be accurately conformed without being influenced by a camera vibration.

Figure 2:
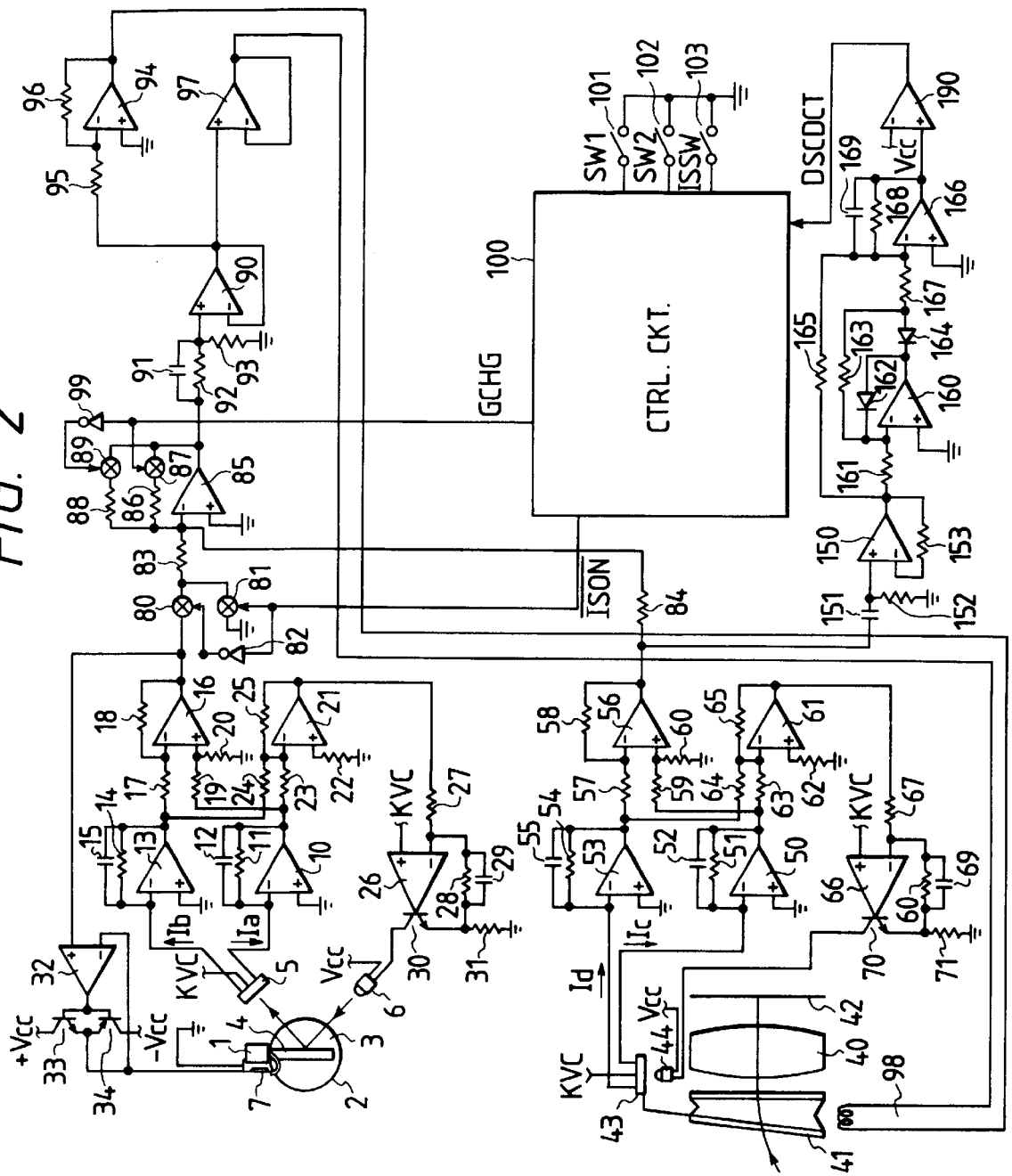
FIG. 2 is a circuit diagram showing an image stabilizing apparatus for a camera according to the second embodiment of the present invention.

FIG. 2 is a circuit diagram showing an image stabilizing apparatus for a camera according to the second embodiment of the present invention. The portions of an angular deviation detection circuit and a variable vertical angle prism control circuit are the same as those in the first embodiment, and a detailed description thereof will be omitted.

The vertical-angle deviation of the variable vertical angle prism extracted from the output from an operational amplifier 56 is input to a differential circuit constituted by an operational amplifier 150, a capacitor 151, and resistors 152 and 153, and a camera vibration signal is removed therefrom like in the first embodiment.

The output from the operational amplifier 150 is half-wave rectified by a known half-wave rectifier constituted by an operational amplifier 160, resistors 161 and 163, and diodes 162 and 164, and the rectified output is amplified by an inverting amplifier circuit constituted by an operational amplifier 166, and resistors 167 and 168. On the other hand, the output from the operational amplifier 150 is directly amplified by an inverting amplifier circuit constituted by the operational amplifier 166, a resistor 165, and the resistor 168. When the ratio of the resistances of the resistors 165 and 167 is set to be "2:1", the output from the operational amplifier 166 has a waveform obtained by full-wave rectifying the output from the operational amplifier 150 in combination with the above-mentioned half-wave rectifier circuit.

The full-wave rectified waveform is smoothed to some extent by a combination of a capacitor 169 and the resistor 168, and a value almost equal to an effective value of the output from the operational amplifier 150 is output from the operational amplifier 166. Therefore, if the feedback loop including the variable vertical angle prism oscillates, the oscillation waveform is almost converted into a DC output through the output from the operational amplifier 56, the differential circuit, and the effective value conversion circuit. This DC output is compared with a positive reference voltage VCL connected to the inverting input terminal of a comparator 170, and if the DC output becomes larger than the reference voltage, an output OSCDCT from the comparator 170 goes to H level. Upon detection of this output, a control circuit 100 executes a control operation for switching the feedback resistor of an operational amplifier 85 to a small value like in the first embodiment so as to decrease the loop gain, thereby stopping the oscillation.

In this embodiment, since the oscillation state of the system is monitored from the effective value of the oscillation waveform unlike in the first embodiment, detection can be more accurately performed.

Figure 3:
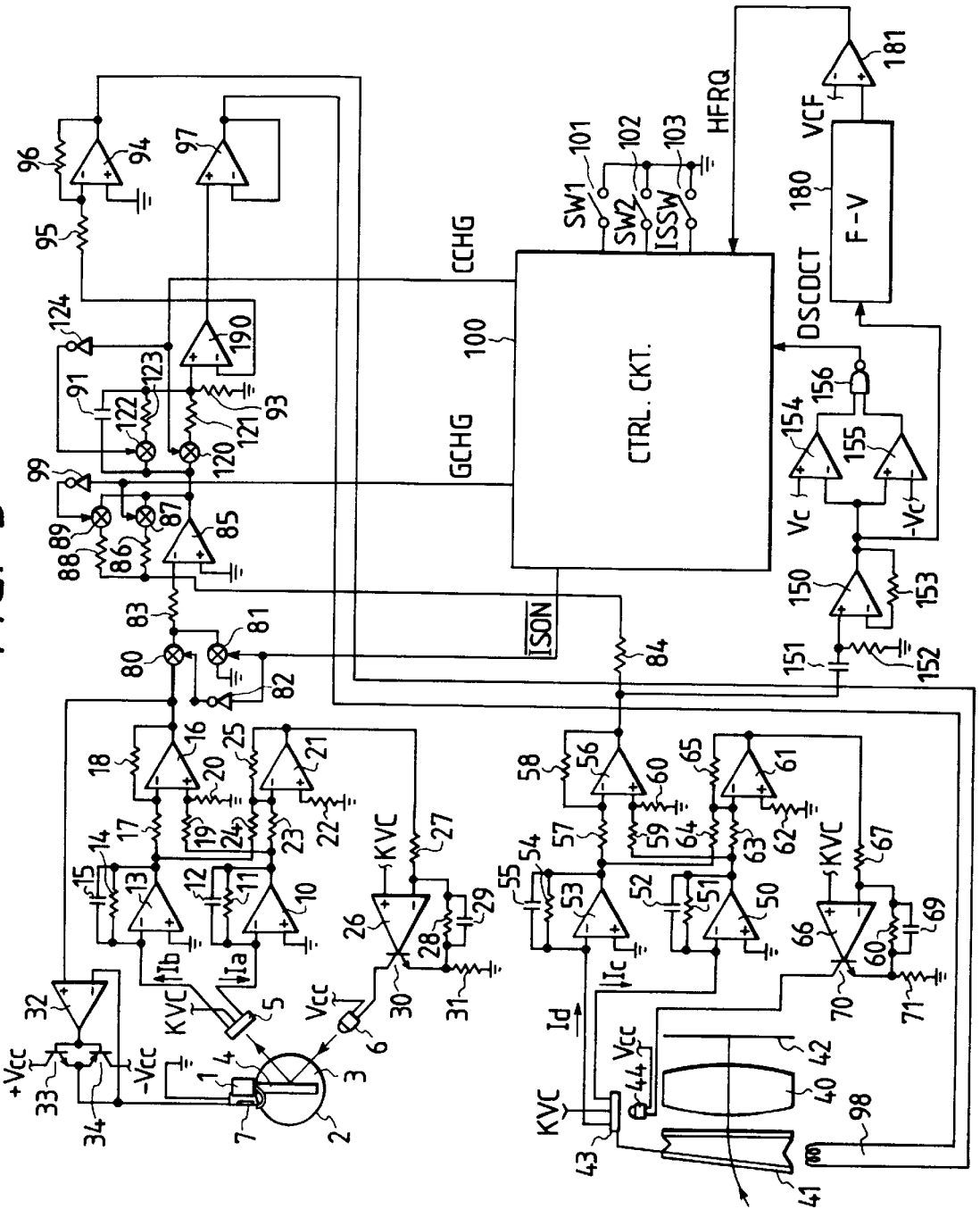
FIG. 3 is a circuit diagram showing an image stabilizing apparatus for a camera according to the third embodiment of the present invention.

FIG. 3 is a circuit diagram showing an image stabilizing apparatus for a camera according to the third embodiment of the present invention. The portions of an angular deviation detection circuit and a variable vertical angle prism control circuit are the same as those in the first embodiment, and a detailed description thereof will be omitted.

The vertical-angle deviation of the variable vertical angle prism extracted from the output from an operational amplifier 56 is input to a differential circuit constituted by an operational amplifier 150, a capacitor 151, and resistors 152 and 153, and a camera vibration signal is removed therefrom like in the first embodiment. The output from the operational amplifier 150 is compared by a window comparator constituted by comparators 154 and 155, and a NAND gate 156 to check whether the feedback loop system oscillates. On the other hand, the output from the operational amplifier 150 is input to an F-V converter 180, and is converted into a DC voltage proportional to the frequency. For example, when the oscillation frequency of the feedback loop system is higher than a predetermined value, and the DC output from the F-V converter 180 is larger than a constant voltage VCF, a comparator 181 sets its output HFRQ at H level. When a control circuit 100 detects that an output OSCDCT goes to H level, it sets an output GCHG at H level and switches a resistance connected to the feedback loop of an operational amplifier 85 as in the first embodiment. Furthermore, the control circuit 100 detects the state of the output HFRQ. When the output HFRQ is at L level, the control circuit 100 determines that the oscillation frequency is lower than the reference frequency, and sets an output CCHG at L level. As a result, an analog switch 120 is turned off, and an analog switch 122 is turned on through an inverter 124, thereby selecting a phase compensation circuit, constituted by a capacitor 91, and resistors 93 and 123, for suppressing an oscillation at the low-frequency side. On the contrary, when the output HFRQ is at H level, the control circuit 100 determines that the oscillation frequency is higher than the reference frequency, and sets the output CCHG at H level. As a result, the analog switch 120 is turned on, and the analog switch 122 is turned off through the inverter 124, thus selecting a phase compensation circuit, constituted by a capacitor 91, and resistors 93 and 121, for suppressing an oscillation at the high-frequency side.

In this manner, in this embodiment, when the oscillation of the feedback loop system is observed, not only the loop gain is switched, but also the phase compensation circuit is switched, thereby realizing a stabler system.

According to each of the above-mentioned embodiments, the deviation of the variable vertical angle prism as the optical correction means subjected to feedback control is detected, and when an oscillation is observed based on the detected output (it is discriminated by checking whether the peak level of the output exceeds a predetermined value or whether or not the effective value of the output exceeds a predetermined value), the loop gain and the value (characteristics) of the phase compensation circuit are immediately electrically changed. For this reason, a very stable system against a disturbance and a change in environmental condition can be realized.

In each of the above embodiments, when an oscillation of the feedback loop system is detected, the loop gain is decreased, or phase compensation characteristics are changed simultaneously with a decrease in loop gain.

However, the present invention is not limited to this. For example, when only the phase compensation characteristics are changed, a certain effect can be expected.

Figure 4:
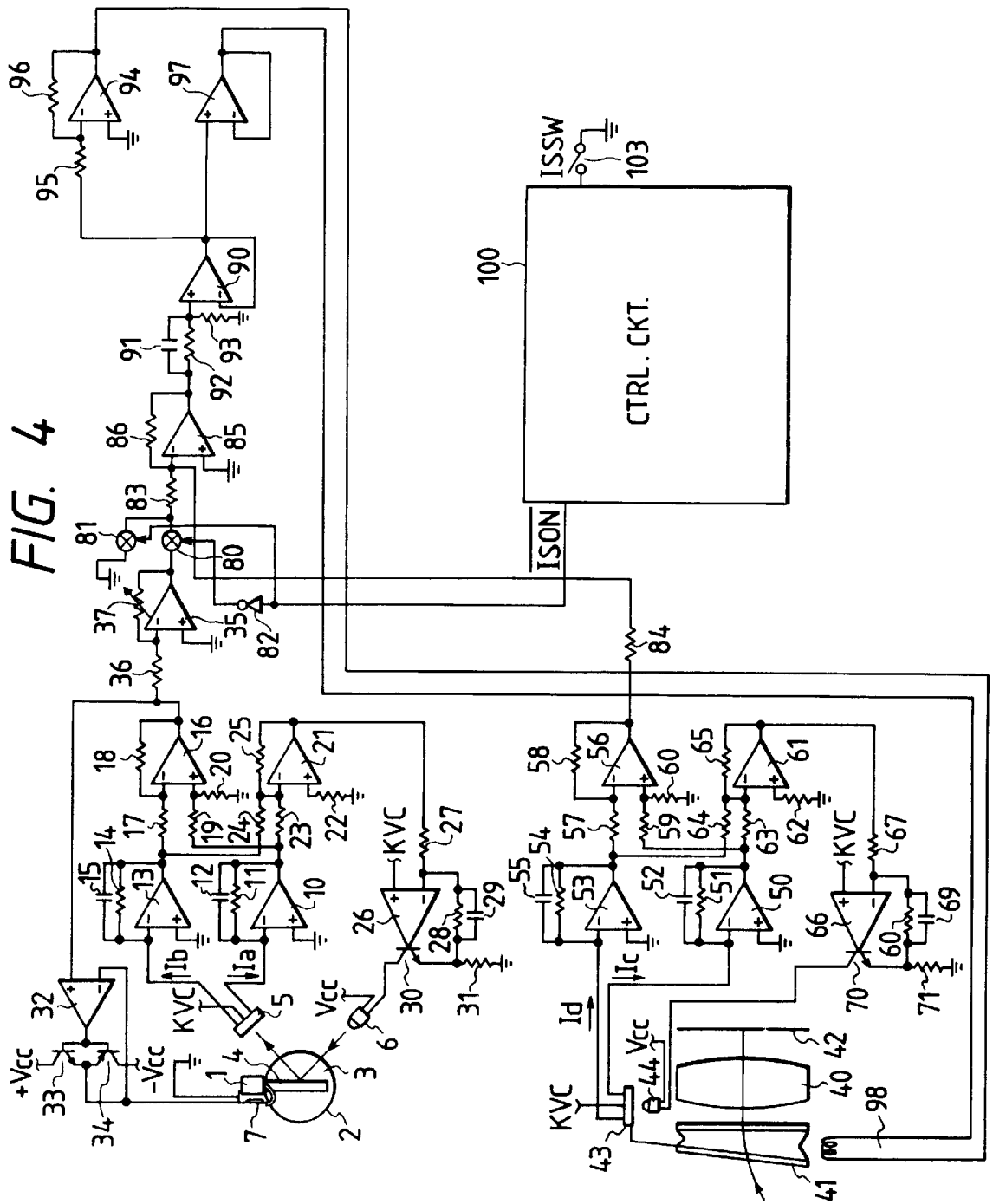
FIG. 4 is a circuit diagram showing a main part arrangement of a camera having an image stabilizing apparatus according to the fourth embodiment of the present invention.

FIG. 4 is a circuit diagram showing an arrangement of a camera having an image stabilizing apparatus according to the fourth embodiment of the present invention. The same reference numerals in FIG. 4 denote the same parts as in the first embodiment shown in FIG. 1.

Since an angular deviation sensor and its detection processing circuit portion (1 to 34), a variable vertical angle prism and its detection processing circuit portion (40 to 71), and a variable vertical angle prism control circuit portion (80 to 100) are the same as those in the first embodiment, a detailed description thereof will be omitted.

An output from an operational amplifier 16 as an output from the angular deviation sensor and corresponding to the moving amount of the angular deviation sensor is amplified to a predetermined level by a variable amplifier constituted by an operational amplifier 35, a resistor 36, and a variable resistor 37. When an image stabilizing switch ISSW directly input to a control circuit 100 is enabled, the control circuit 100 starts an image stabilizing control operation of this arrangement, and sets an output $\overline{\text{ISON}}$ at L level. As a result, since the output from an inverter 82 goes to H level, an analog switch 80 is turned on, and an analog switch 81 is turned off. Therefore, the output from the operational amplifier 35 is connected to the inverting input terminal of an operational amplifier 85 through a resistor 83, and the output from an operational amplifier 56, corresponding to the vertical-angle deviation of a variable vertical angle prism 41, is also connected to the inverting input terminal of the operational amplifier 85 through a resistor 84. In practice, since the output from the operational amplifier 35 has a phase difference of 180° from the output from the operational amplifier 56 via the resistor 84, an adder amplifier constituted by the operational amplifier 85, the resistor 83, and a resistor 86 equivalently outputs a difference between the moving amount of the angular deviation sensor and the moving amount of the variable vertical angle prism.

The output from the operational amplifier 85 is input to a phase compensation circuit constituted by an operational amplifier 90, resistors 92 and 93, and a capacitor 91, thus performing phase compensation of the entire feedback system. Thereafter, since the output from the operational amplifier 90 is input to a non-inverting type power amplifier circuit constituted by an operational amplifier 97, and an inverting type power amplifier circuit constituted by an operational amplifier 94, and resistors 95 and 96, a driving coil 98 connected between these two power amplifier circuits is bidirectionally energized based on the outputs from the two amplifier circuits, thus driving the variable vertical angle prism 41.

With the above-mentioned system arrangement, feedback control can be executed, so that the output from the angular deviation sensor and the output corresponding to the deviation of the variable vertical angle prism maintain a predetermined proportional relationship therebetween.

FIGS. 5A to 5C show the frequency characteristics of the respective control systems constituting the system of this embodiment.

FIG. 5A shows the characteristics obtained when an output per unit input angle of the angular deviation sensor is extracted as the output from an operational amplifier 32. The characteristics indicated by a solid curve correspond to designed gain characteristics. However, when the positional precision of a PSD 5 or the resistive precision of the detection system is shifted, the value of the gain becomes different from the designed value, as indicated by a dotted curve.

FIG. 5B shows the characteristics obtained when an output per unit correction angle (for example, a vertical-angle deviation angle necessary for correcting a camera vibration input of 1° is given by "n/(n−1)×1°" where n is the refractive index of a liquid) of the variable vertical angle prism 41 is extracted as the output from the operational amplifier 56.

Furthermore, FIG. 5C expresses a moving angle per unit camera vibration input angle on the film surface on the frequency axis when the image stabilizing system of this embodiment is enabled. A solid curve represents a case wherein the output per unit input angle of the angular deviation sensor and the output per unit correction angle of the variable vertical angle prism 41 have a "1:1" relationship therebetween in design. In the characteristics at this time, when the loop gain of the feedback circuit including the correction optical system is G times, the image moving amount on the film surface is "|1/(1+G)|" times as compared to a case wherein the image stabilizing system is not enabled.

On the other hand, as indicated by the dotted curve in FIG. 5A, when the output per unit input angle from the angular deviation sensor becomes a times for "1", the characteristics of this image stabilizing system are as indicated by the dotted curve in FIG. 5C, and the image moving amount on the film surface becomes "|{1+G(1−a)}/(1+G)|" times as compared to a case wherein the image stabilizing system is not enabled. As a result, the characteristics of the entire image stabilizing system are considerably deteriorated as compared to the designed value although they depend on the value a.

In this embodiment, an angular deviation output gain changing means constituted by the operational amplifier 35, the resistor 36, and the variable resistor 37 is used to correct an output variation per unit input angle of an individual angular deviation sensor, so that optimal image stabilization performance can always be obtained.

Figure 6:
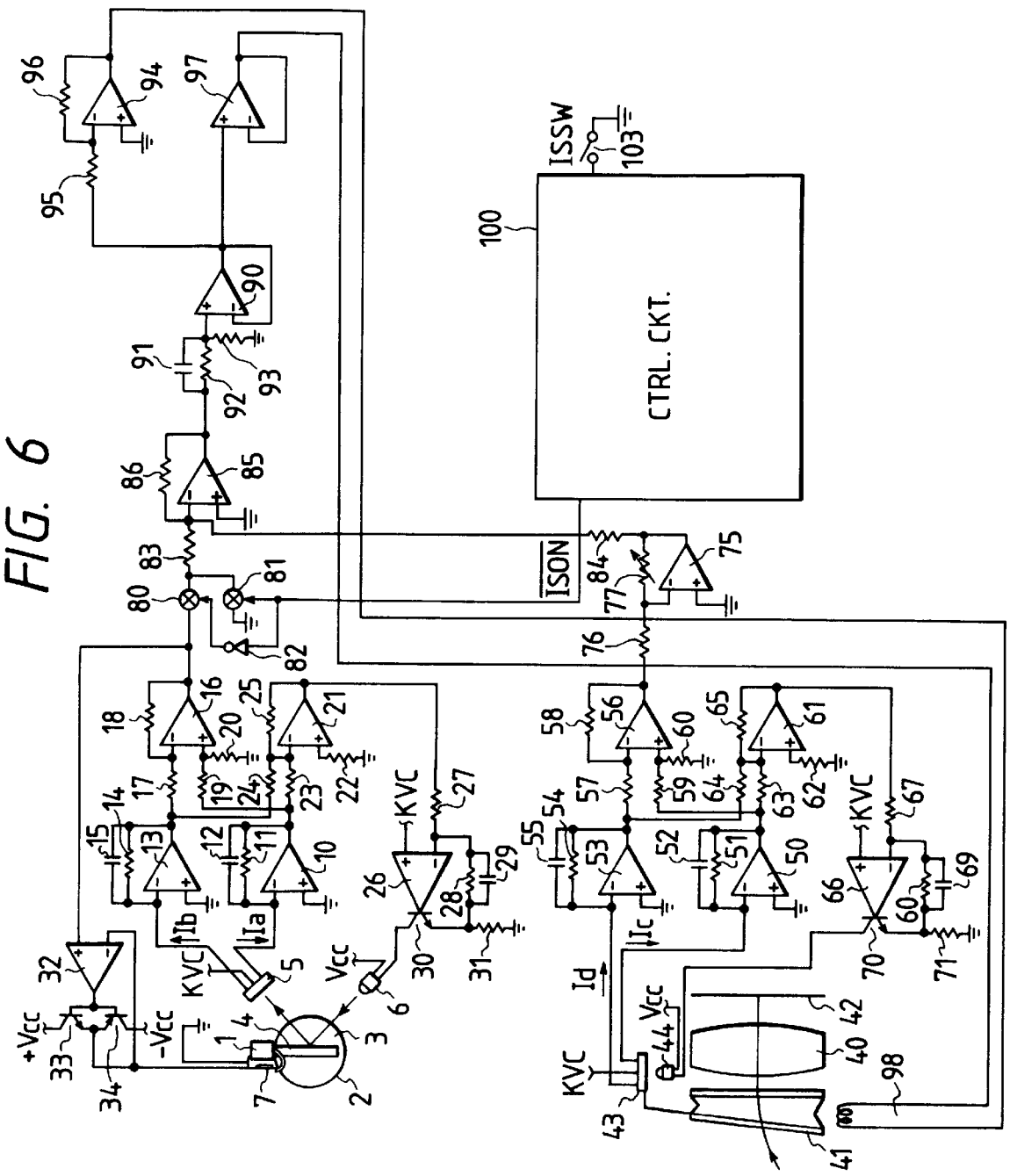
FIG. 6 is a circuit diagram showing a main part arrangement of a camera having an image stabilizing apparatus according to the fifth embodiment of the present invention.

FIG. 6 is a circuit diagram showing a main part of a camera having an image stabilizing apparatus according to the fifth embodiment of the present invention. Since an angular deviation sensor and its detection processing circuit portion (1 to 34), a variable vertical angle prism and its detection processing circuit portion (40 to 71), and a variable vertical angle prism control circuit portion (80 to 100) are the same as those in the first embodiment, a detailed description thereof will be omitted.

In the fifth embodiment, the output from an operational amplifier 56 is connected to a resistor 84 through a variable amplifier circuit constituted by an operational amplifier 75, a resistor 76, and a variable resistor 77.

FIGS. 7A to 7C show the frequency characteristics of control systems constituting the system of this embodiment like in FIGS. 5A to 5C.

FIG. 7A shows the frequency characteristics of the angular deviation sensor, i.e., an output per unit input angle of an operational amplifier 16. FIG. 7B shows the driving frequency characteristics of a variable vertical angle prism 41, i.e., an output per unit correction angle of the operational amplifier 56. FIG. 7C shows an image moving angle per unit camera vibration input angle on a film surface when the image stabilizing system of this embodiment is enabled.

When the output per unit correction angle of the variable vertical angle prism 41 is obtained as designed, characteristics indicated by a solid curve in FIG. 7B are obtained. When the positional precision of a PSD 43 or the resistive precision of the detection system is shifted, the value of the gain becomes different from the designed value, as indicated by a dotted curve. In this case, in FIG. 7C, although characteristics indicated by a solid curve can be obtained in design, characteristics indicated by a dotted curve are obtained when the output per unit correction angle of the variable vertical angle prism 41 is shifted from the designed value. Thus, image stabilizing performance on the film surface is considerably deteriorated.

Therefore, in this embodiment, a variable vertical angle prism output gain changing means constituted by the operational amplifier 75, the resistor 76, and the variable resistor 77 is used to correct an output variation per unit correction angle of an individual variable vertical angle prism as the correction optical system.

Figure 8:
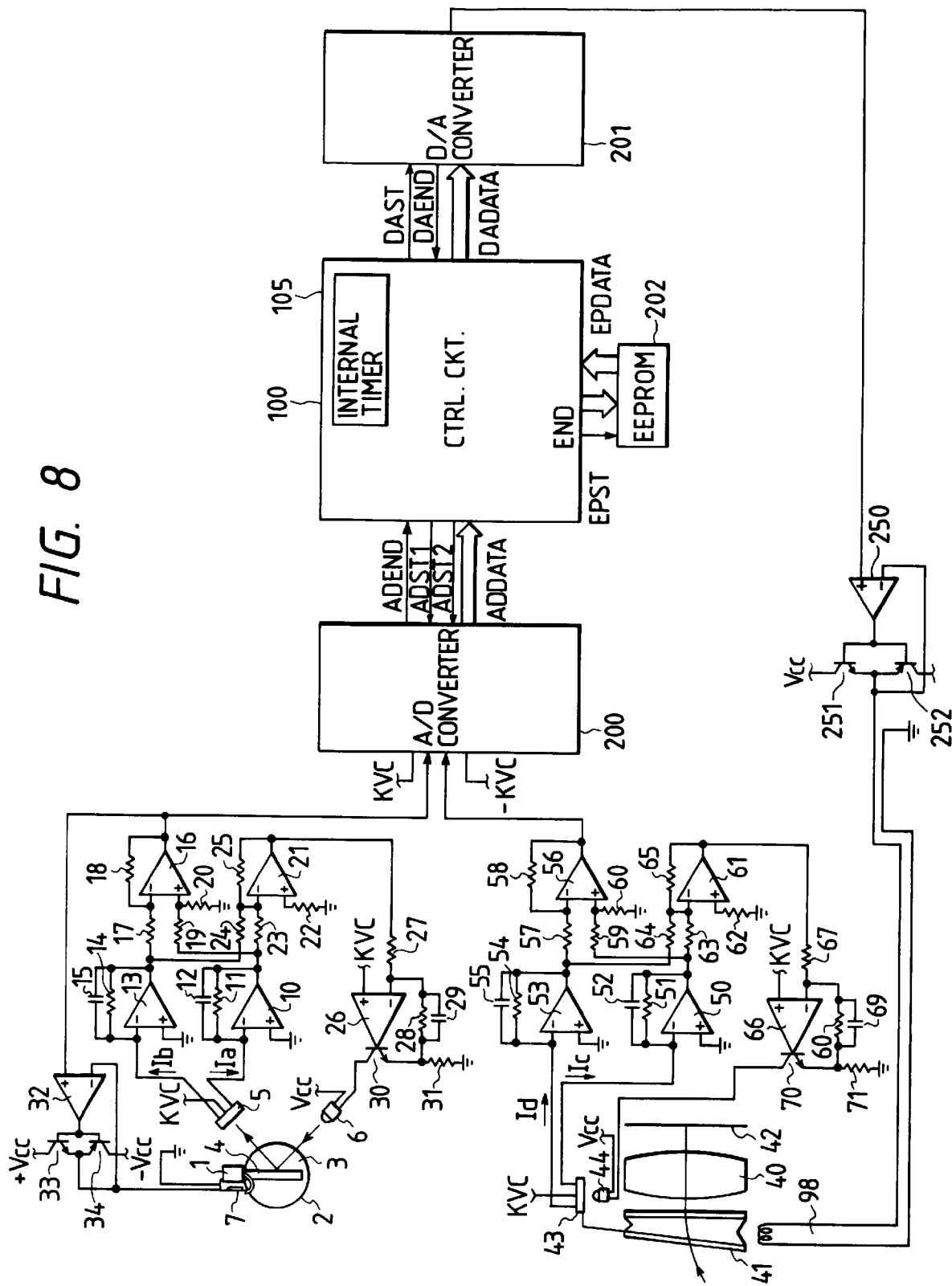
FIG. 8 is a circuit diagram showing a main part arrangement of a camera having an image stabilizing apparatus according to the sixth embodiment of the present invention.

FIG. 8 is a circuit diagram showing a main part of a camera having an image stabilizing apparatus according to the sixth embodiment of the present invention. Since an angular deviation sensor and its detection processing circuit portion (1 to 34) and a variable vertical angle prism and its detection processing circuit portion (40 to 71) are the same as those in the first embodiment, a detailed description thereof will be omitted.

The output from an operational amplifier 16 representing the angular deviation of the angular deviation sensor, and the output from an operational amplifier 56 representing the vertical-angle deviation of a variable vertical angle prism 41 are input to an A/D converter 200, and are converted into digital values by a control signal from a control circuit 100. Thereafter, the control circuit 100 performs predetermined calculation processing using the digital values. In this case, the control circuit 100 reads out data from an EEPROM 202 which is connected to the control circuit 100, and stores data for correcting the characteristics of an individual sensor, and performs a sensor correction calculation. The calculation result from the control circuit 100 is supplied to a D/A converter 201, and is converted into an analog value. The analog value is output to a power amplifier circuit constituted by an operational amplifier 250, and transistors 251 and 252. Therefore, since the output from the power amplifier circuit is connected to a coil 98 for driving the variable vertical angle prism 41, the variable vertical angle prism 41 is driven by a current proportional to the calculation result.

Figure 9B:
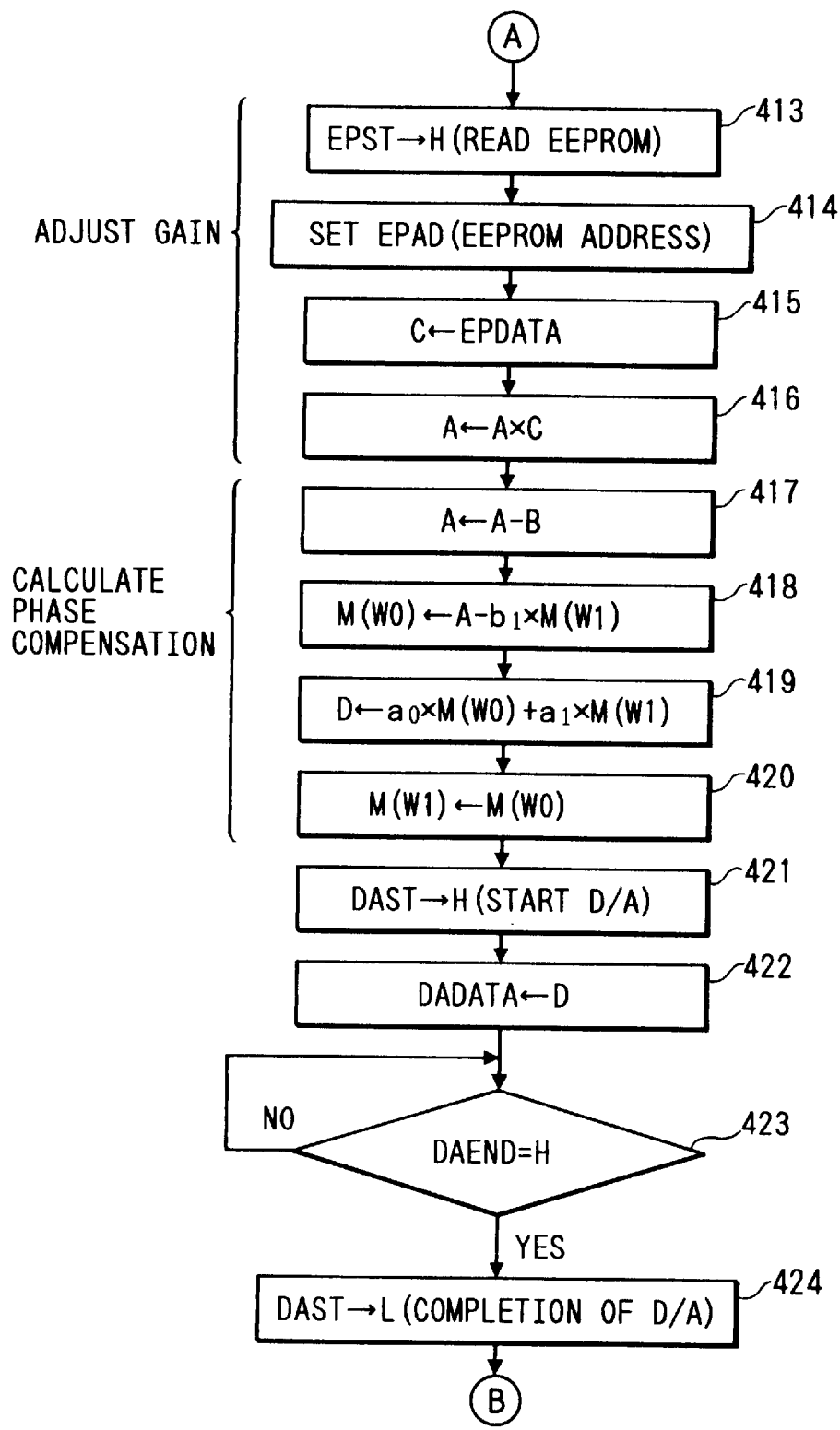
FIG. 9 is a flowchart showing an operation of a control circuit shown in FIG. 8.

The calculation control method of the control circuit 100 will be described below with reference to the flowchart shown in FIG. 9.

In step 400, an internal memory M(W1) for a digital calculation (to be described later) is initialized to "0". In step 401, an internal timer 105 of the control circuit 100, which timer is used for real-time sampling control at predetermined time intervals T, is initialized. Thereafter, in step 402, the internal timer 105 is started. In step 403, it is checked if the count of the internal timer 105 has reached the predetermined time T. If YES in step 403, the flow advances to step 404, and the internal timer 105 is reset.

In step 405, an output ADST1 from the control circuit 100 goes to H level to start an A/D conversion operation of the output from the angular deviation sensor. If it is detected in step 406 that an output ADEND goes to H level, the output from the A/D converter 200 is transferred to an A register in the control circuit 100 through a data bus ADDATA in step 407. In step 408, the output ADST1 goes to L level, thus ending the operation of the A/D converter 200.

Similarly, in step 409, an output ADST2 from the control circuit 100 goes to H level to start an A/D conversion operation of the vertical-angle deviation of the variable vertical angle prism 41. If it is detected in step 410 that the output ADEND goes to H level, the output from the A/D converter 200 is transferred to a B register in the control circuit 100 through the data bus ADDATA in step 411. In step 412, the output ADST2 goes to L level, thus ending the operation of the A/D converter 200.

In step 413, an output EPST from the control circuit 100 goes to H level to read out a value from the EEPROM 202 which pre-stores data for correcting a variation of an output per unit input angle of the individual angular deviation sensor from the designed value. In step 414, an address of necessary EEPROM data is output through EPAD, and in step 415, a predetermined EEPROM data value is transferred to a C register in the control circuit 100 through a data bus EPDATA. In step 416, the content of the A register set with the output value from the angular deviation sensor is multiplied with the content of the C register set with the correction data, thereby correcting the output from the angular deviation sensor. The correction result is stored again in the A register.

In step 417, the content of the B register is subtracted from the content of the A register, and the difference between the corrected output value of the angular deviation sensor and the vertical-angle deviation out put value from the variable vertical angle prism is set in the A register. In steps 418 to 420, a phase compensation calculation of the feedback system of the entire system of this embodiment is digitally executed.

Figure 10:
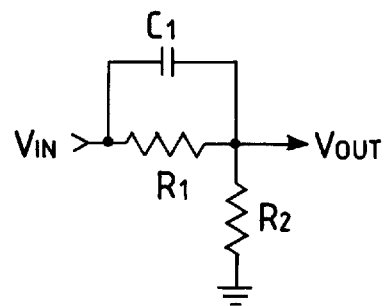
FIG. 10 is a circuit diagram for explanation of a phase compensation calculation in the sixth embodiment of the present invention.

When the characteristics of a phase advance compensation circuit shown in FIG. 10 are expressed on the S plane, we have:

$$H(S) = \frac{V_{OUT}}{V_{IN}} = \frac{R2 + SC1 \cdot R1 \cdot R2}{R1 + R2 + SC1 \cdot R1 \cdot R2} \quad (1)$$

When this equation is expressed as an equation on the Z plane for executing digital control by means of known S-Z transform, we have:

$$H(Z) = \frac{\frac{\frac{1}{C1 \cdot R1} + \frac{2}{T}}{\frac{R1+R2}{C1 \cdot R1 \cdot R2} + \frac{2}{T}} + \frac{\frac{1}{C1 \cdot R1} - \frac{2}{T}}{\frac{R1+R2}{C1 \cdot R1 \cdot R2} + \frac{2}{T}} \times Z^{-1}}{1 + \frac{\frac{R1+R2}{C1 \cdot R1 \cdot R2} - \frac{2}{T}}{\frac{R1+R2}{C1 \cdot R1 \cdot R2} + \frac{2}{T}} \times Z^{-1}} \quad (2)$$

Therefore, the coefficient values are respectively set in advance as follows:

$$a0 = \frac{\frac{1}{C1 \cdot R1} + \frac{2}{T}}{\frac{R1+R2}{C1 \cdot R1 \cdot R2} + \frac{2}{T}} \quad (3)$$

$$a1 = \frac{\frac{1}{C1 \cdot R1} - \frac{2}{T}}{\frac{R1+R2}{C1 \cdot R1 \cdot R2} + \frac{2}{T}} \quad (4)$$

$$b1 = \frac{\frac{R1+R2}{C1 \cdot R1 \cdot R2} - \frac{2}{T}}{\frac{R1+R2}{C1 \cdot R1 \cdot R2} + \frac{2}{T}} \quad (5)$$

where T is the sampling time.

In step 418, a product of the constant b1 and the content of the internal memory M(W1) is subtracted from the content of the A register, and the difference is set in an internal memory M(W0). In step 419, the product of the constant a0 and the content of the memory M(W0) is added to the product of the constant a1 and the content of the memory M(W1), and the sum is set in a D register. Thereafter, in step 420, the content of the memory M(W0) is set in the memory M(W1) for the next sampling control.

In order to convert the calculation result into an analog value through the D/A converter 201, in step 421, an output DAST goes to H level to start the operation of the D/A converter 201. In step 422, the content of the D register is transferred to the D/A converter 201 through a data bus DADATA. If it is detected in step 423 that an output DAEND goes to H level, the output DAST goes to L level in step 424, thus ending D/A conversion.

In this manner, when the output from the angular deviation sensor obtained through the A/D converter 200 is multiplied with the correction coefficient set in the EEPROM 202, the variation in the output per unit input angle of the individual angular deviation sensor can be corrected.

In this embodiment, the EEPROM 202 is used for correcting a variation in the angular deviation sensor. A variation in the output per unit correction angle of the variable vertical angle prism as the correction optical system can also be corrected using the EEPROM 202.

According to the fourth to sixth embodiments, even when the output per unit angle of the angular deviation sensor or the correction optical system largely varies due to variations in mechanical mounting precision of each product or detection precision of the processing circuit, since a means for electrically (in an analog manner or digitally) adjusting the value is added, the image stabilizing effect of the apparatus can be set in an optimal state.

In the fourth to sixth embodiments, the angular deviation sensor utilizing the inertia of the liquid is used as the vibration detection means. The same correction method as described above can be used when a known vibration gyro is used as the angular speed sensor, and when a shift optical system for driving some components of a photographing lens in the X- and Y-directions perpendicular to the photographing optical axis is used as the correction optical system.

Figure 11:
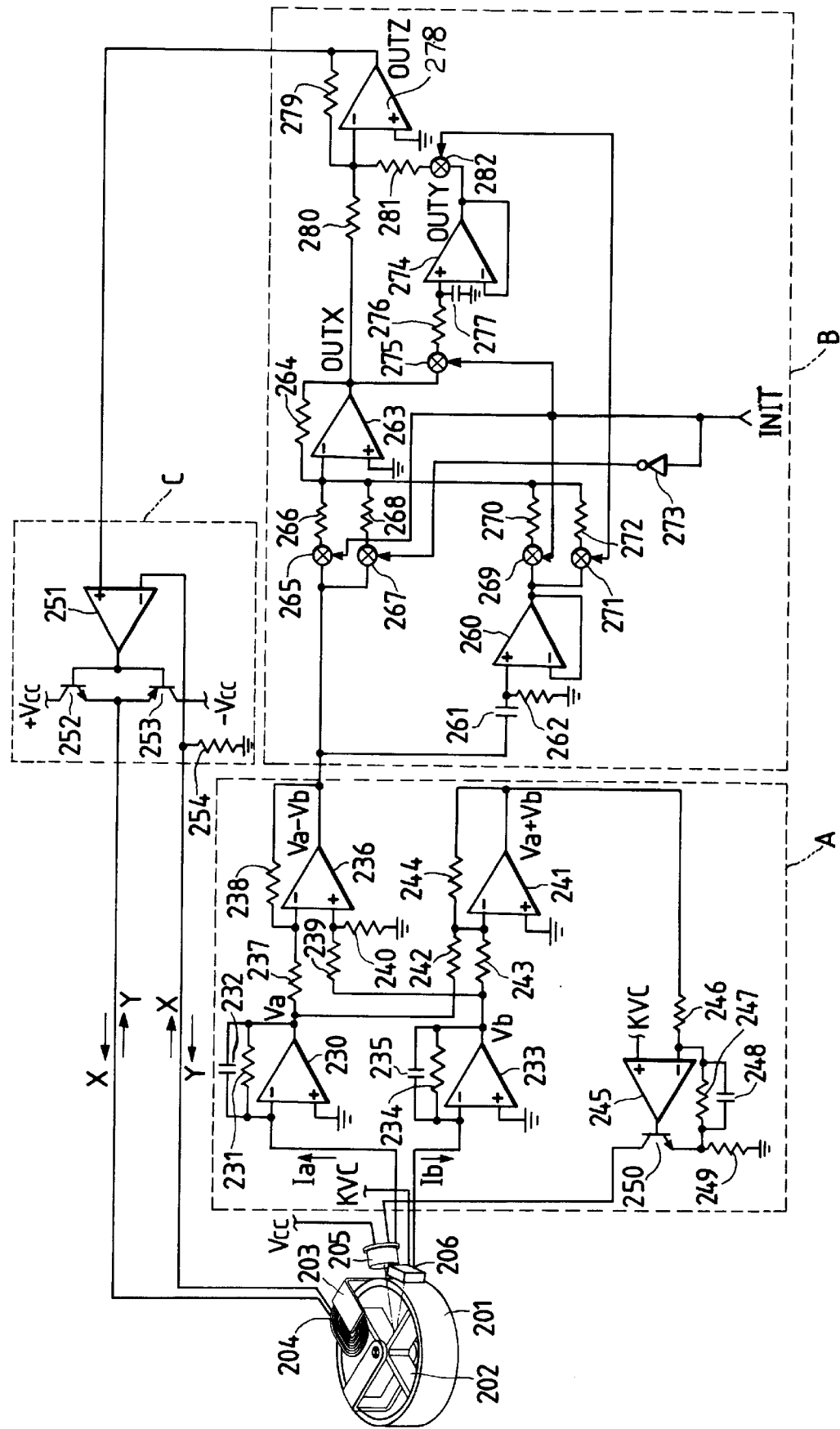
FIG. 11 is a circuit diagram showing an arrangement of an image stabilizing apparatus according to the seventh embodiment of the present invention.

FIG. 11 is a circuit diagram showing a circuit arrangement of an image stabilizing apparatus for a camera according to the seventh embodiment of the present invention.

In FIG. 11, a portion indicated by a broken line A is a position detection circuit for optically detecting the position of a float 202 relative to an outer cylinder 201 in an angular deviation sensor. Infrared light emitted from a light-emitting element (iRED) 205 and reflected by the float 202 is incident on a semiconductor position detector (PSD) 206, and a photocurrent I generated by the PSD according to this optical energy is divided into photocurrents Ia and Ib according to the center-of-gravity position of the infrared light incident on the PSD 206. The photocurrent Ia is converted into a voltage Va by a current-voltage conversion circuit constituted by an operational amplifier 230, a resistor 231, and a capacitor 232, and the photocurrent Ib is converted into a voltage Vb by a current-voltage conversion circuit constituted by an operational amplifier 233, a resistor 234, and a capacitor 235.

These output voltages Va and Vb are input to a differential amplifier constituted by an operational amplifier 236, and resistors 237, 238, 239, and 240, and are converted into a difference signal (Va−Vb) corresponding to the relative position of the float 202. The output voltages Va and Vb are also input to an adder amplifier constituted by an operational amplifier 241, and resistors 242, 243, and 244, and are converted into a sum signal (Va+Vb) corresponding to the photocurrent I.

The sum signal (Va+Vb) is input to an iRED driving circuit constituted by an operational amplifier 245, resistors 246, 247, and 249, and a transistor 250. Negative feedback control is always executed, so that when the sum signal becomes larger than a predetermined voltage KVC, an iRED current is decreased; otherwise, the iRED current is increased. As a result, the sum signal (Va+Vb) becomes always equal to the predetermined voltage KVC. Note that a capacitor 248 is a phase compensation capacitor for preventing this feedback system from oscillating.

In this manner, when the photocurrent I (=Ia+Ib) generated by the PSD 206 is always kept constant, the difference signal (Va−Vb) from the operational amplifier 236 can always accurately detect the relative position between the outer cylinder 201 and the float 202 without being influenced by a change in power of the iRED 205 due to a change in temperature and variations of the elements.

A portion indicated by a broken line B is a processing circuit for quickly removing an offset of the angular deviation sensor in practice. This processing circuit will be described below with reference to FIG. 11 and the timing chart shown in FIG. 12.

Figure 12:
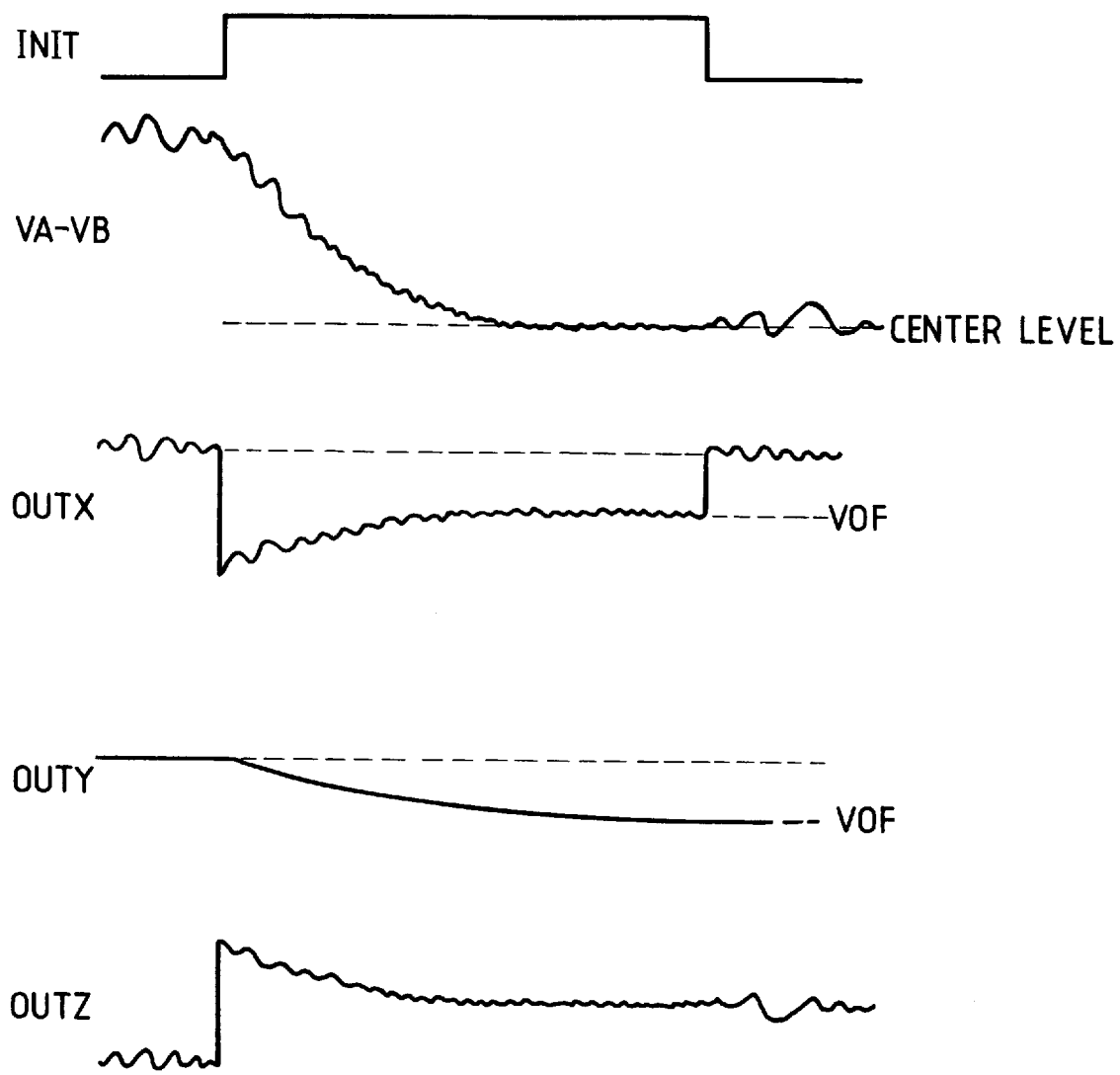
FIG. 12 is a timing chart for explanation of the operation of the circuit shown in FIG. 11.

As shown in FIG. 12, when a control signal INIT from a control circuit (not shown) goes to H level, an analog switch 265 is turned on, and an inverting amplifier constituted by an operational amplifier 263, and resistors 264 and 266 is enabled. Since the resistance of the resistor 266 is smaller than that of a resistor 268, the gain of the inverting amplifier becomes larger than that obtained when the resistor 268 is selected.

An operational amplifier 260, a capacitor 261, and a resistor 262 constitute a differential circuit, and a value obtained by differentiating the difference signal (Va−Vb) is output from the operational amplifier 260. When the control signal INIT goes to H level, since an analog switch 269 is turned on, and a resistor 270 is selected, the output from the operational amplifier 260 is applied to the resistor 270. Since the resistance of the resistor 270 is smaller than that of a resistor 272, the gain of an inverting amplifier constituted by the operational amplifier 263, and the resistors 264 and 270 becomes larger than that obtained when the resistor 272 is selected.

With the above-mentioned operation, an output obtained by directly inverting and amplifying the difference signal (Va−Vb) is added to an output obtained by inverting and amplifying the differential result of the difference signal (Va−Vb) through the operational amplifier 263, and this sum is an output OUTX. The output OUTX is inverted and amplified again by an inverting amplifier constituted by an operational amplifier 278, and resistors 279 and 280, and the amplified output is supplied as an output OUTZ from the operational amplifier 278 to a driver circuit portion indicated by a broken line C.

The portion indicated by the broken line C is a driver circuit portion for actually driving a coil 204, as described above. An operational amplifier 251, transistors 252 and 253, and a current detection resistor 254 constitute a push-pull type constant current circuit, and currents flow in the X- and Y-directions according to the polarity of an output OUTZ, as shown in FIG. 11.

As described above, since the coil 204 is energized by currents proportional to the difference signal (Va−Vb) as the relative position signal between the outer cylinder 201 and the float 202, and a value obtained by differentiating the difference signal (Va−Vb), a force based on the Fleming's left-hand rule acts on the coil 204 placed in a closed magnetic circuit constituted by the float 202 and a yoke 203, as described above. Since the coil 204 is fixed to the outer cylinder 201, the float 202 receives a force proportional to a current value supplied to the coil 204 as a reaction force. Therefore, in this state, since the force acts in a direction to return the float 202 to a reference position with reference to the outer cylinder 201, a force according to the output OUTX from the operational amplifier 263 acts as a so-called spring force, and a force according to the output from the operational amplifier 260 acts as a viscous force.

When the control signal INIT from the control circuit (not shown) goes to H level, and the above-mentioned spring and viscous forces are immediately increased, the difference signal (Va−Vb) immediately approaches the reference position (center level) from a state wherein it is largely separated away from the reference position, as shown in FIG. 12. The waveforms shown in FIG. 12 finely oscillate due to the influence of a camera vibration of a photographer. The output OUTX represents an output proportional to the sum of the actual spring and viscous forces, and is instantaneously increased very much when the control signal INIT goes to H level. Thereafter, the output OUTX is exponentially decreased to a predetermined level $V_{OF}$ in synchronism with the movement of the float 202 approaching the reference position.

At this time, the float 202 has reached almost the reference position, and is stable. In this state, the gravity component due to the above-mentioned mechanical unbalance is balanced with the spring and viscous forces upon energization of the coil. Therefore, since the float 202 reaches a position near the reference position, infrared light emitted from the iRED 205 and reflected by the float 202 is set within a range capable of detecting a normal camera vibration without falling outside the PSD 206. However, in this case, since spring and viscosity coefficients are very large, the characteristics of the angular deviation sensor are deteriorated.

Figure 13:
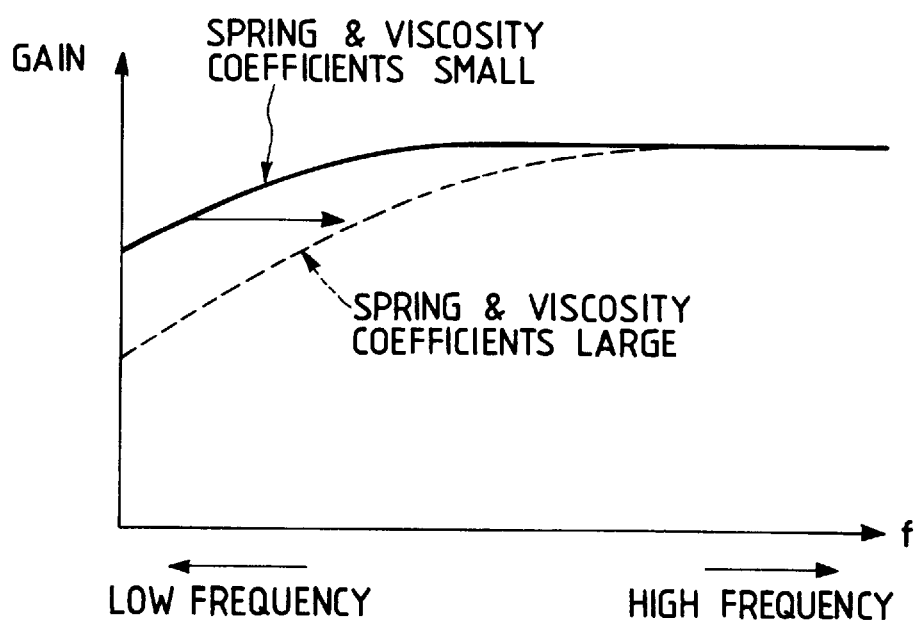
FIG. 13 is a graph for explaining a difference in characteristics obtained when the spring coefficient and the viscosity coefficient of the image stabilizing apparatus are increased and decreased.

FIG. 13 shows the frequency characteristics of the angular deviation sensor. The frequency is plotted along the abscissa, and the output ratio of the angular deviation sensor to the actual camera vibration input angle is plotted along the ordinate. As can be seen from FIG. 13, when the spring and viscosity coefficients are increased, as described above, performance at the low-frequency side is deteriorated, as indicated by a dotted graph. A sample-hold circuit constituted by an operational amplifier 274, a resistor 276, and a capacitor 277 stores the level of the output OUTX through an analog switch 275, and an output OUTY from the operational amplifier 274 is decreased to $V_{OF}$ through the above-mentioned low-pass filter like in the output OUTX, as shown in FIG. 12.

More specifically, while the control signal INIT is at H level, an analog switch 282 is kept OFF, and the output OUTY is not input to an inverting amplifier constituted by an operational amplifier 278, and resistors 279 and 281. When the control signal INIT goes to L level after an elapse of a predetermined period of time, the analog switches 265 and 269 are turned off, and analog switches 267 and 271 are turned on in turn. Thus, the above-mentioned electrically generated spring and viscosity coefficients are set to be original small values. In this state, the float 202 in the angular deviation sensor is moved again to the original position due to the gravity. However, the level corresponding to the spring and viscous forces set when the float 202 is balanced at a given reference position is stored in the operational amplifier 274, and is input to the above-mentioned inverting amplifier since the analog switch 282 is turned on in response to the L-level control signal INIT. Therefore, the DC level of the output OUTZ shown in FIG. 12 is left unchanged even when the control signal INIT goes to L level, and a predetermined DC current flows through the driver circuit portion C. Thus, the float 202 can stay near the reference position by the above-mentioned operation.

Figure 14:
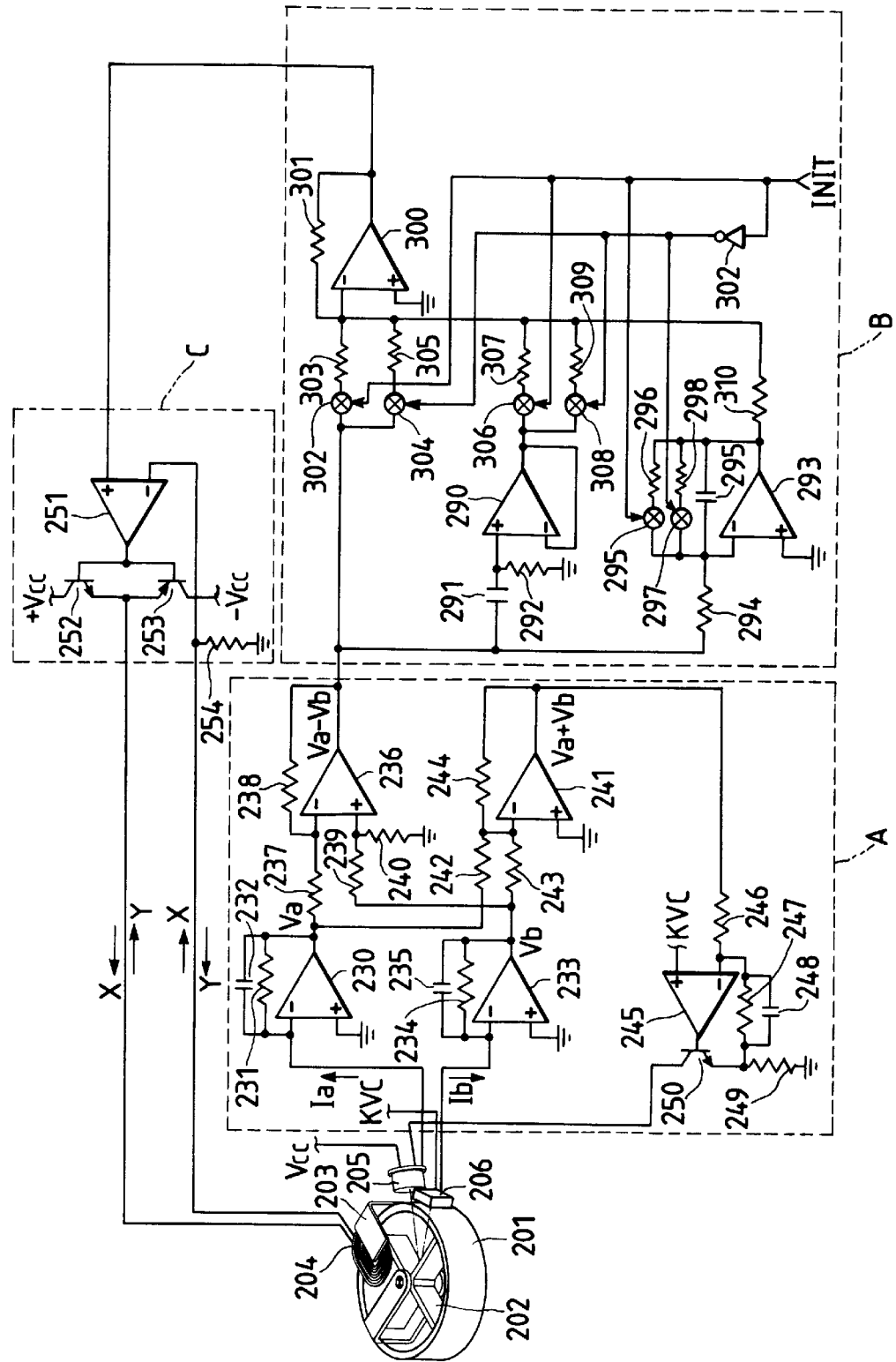
FIG. 14 is a circuit diagram showing an arrangement of an image stabilizing apparatus according to the eighth embodiment of the present invention.

FIG. 14 is a circuit diagram showing a circuit arrangement of an image stabilizing apparatus for a camera according to the eighth embodiment of the present invention. Note that a position detection circuit portion and a driver circuit portion indicated by broken lines A and C in FIG. 14 are the same as those in FIG. 11, and a detailed description thereof will be omitted.

A portion indicated by a broken line B is a processing circuit for actually removing an offset due to unbalance of an angular deviation sensor, and an integration circuit is added as a new component.

A difference signal (Va−Vb) from an operational amplifier 236 is differentiated by a differential circuit constituted by an operational amplifier 290, a capacitor 291, and a resistor 292, and is also integrated by an integration circuit constituted by an operational amplifier 293, a capacitor 295, and resistors 294 and 296.

When a control signal INIT from a control circuit (not shown) goes to H level, analog switches 302, 306, and 295 are turned on, and resistors 303, 307, and 296 are enabled. Since the resistances of the resistors 303, 307, and 296 are smaller than those of resistors 305, 309, and 298 which are selected when the control signal INIT is at L level, the gain of an inverting adder amplifier constituted by an operational amplifier 300 and a resistor 301 becomes very large. Therefore, spring and viscous forces generated inside the angular deviation sensor are immediately increased, and a float 202, which is largely shifted from a reference position of an outer cylinder 201 due to mechanical unbalance, immediately approaches the reference position. In a state wherein the float 202 approaches the reference position, as time elapses, the force by the integration circuit is gradually increased, and finally, a DC component corresponding to mechanical unbalance is corrected by an integration force corresponding to the output from the integration circuit.

When the control signal INIT goes to L level after an elapse of a predetermined period of time, analog switches 304, 308, and 297 are turned on in turn through an inverter 302, and the resistors 305, 309, and 298 are selected. As a result, the electrically generated spring, viscosity, and integration coefficients are set to be original small values. In this state, the float 202 in the angular deviation sensor is moved again to the original position due to the gravity. However, in practice, since a DC force against the mechanical unbalance is set by the integration force set by the integration circuit of the present invention, the float 202 can hold a static state at the reference position.

Figure 15:
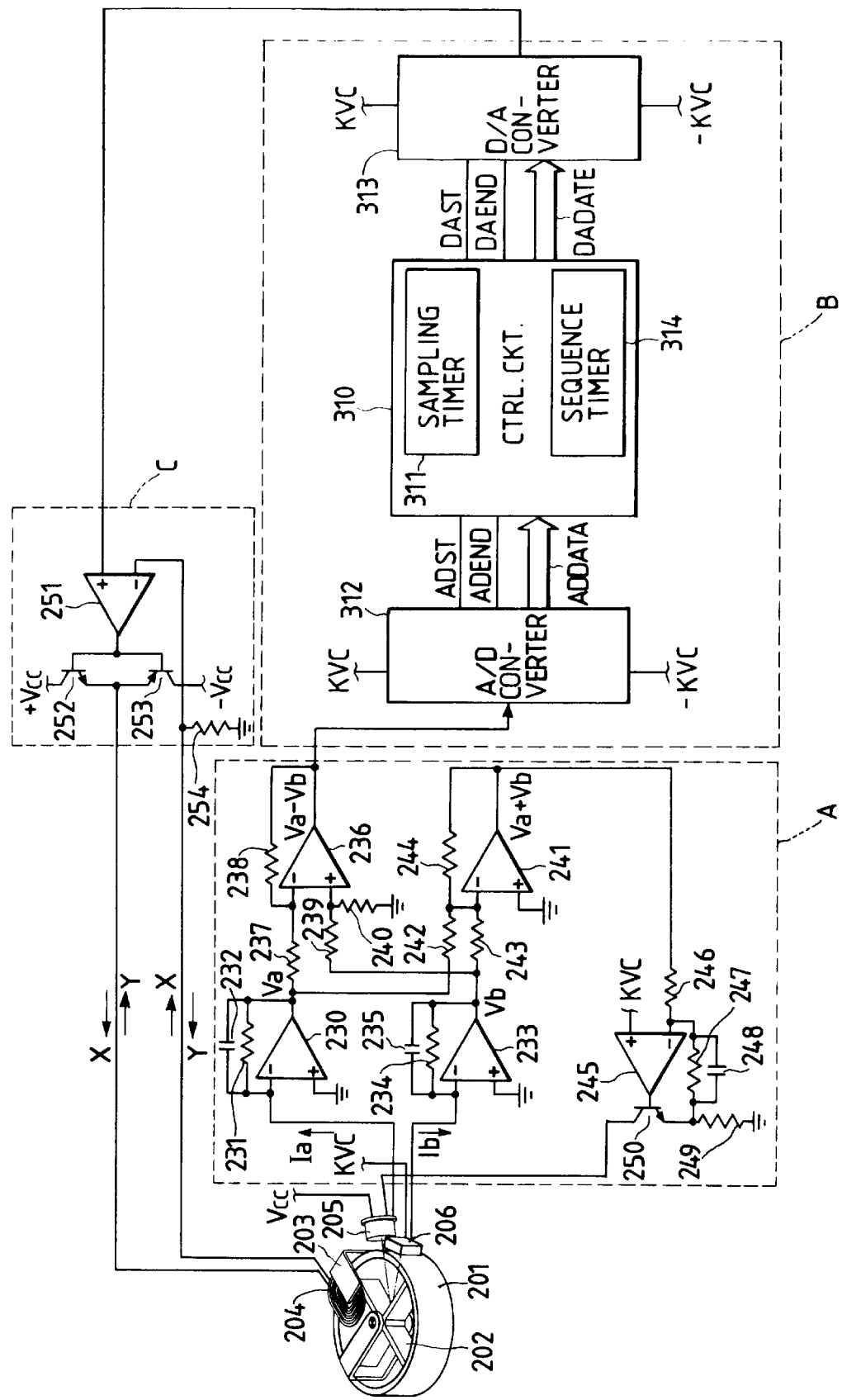
FIG. 15 is a circuit diagram showing an arrangement of an image stabilizing apparatus according to the ninth embodiment of the present invention.
Figure 16:
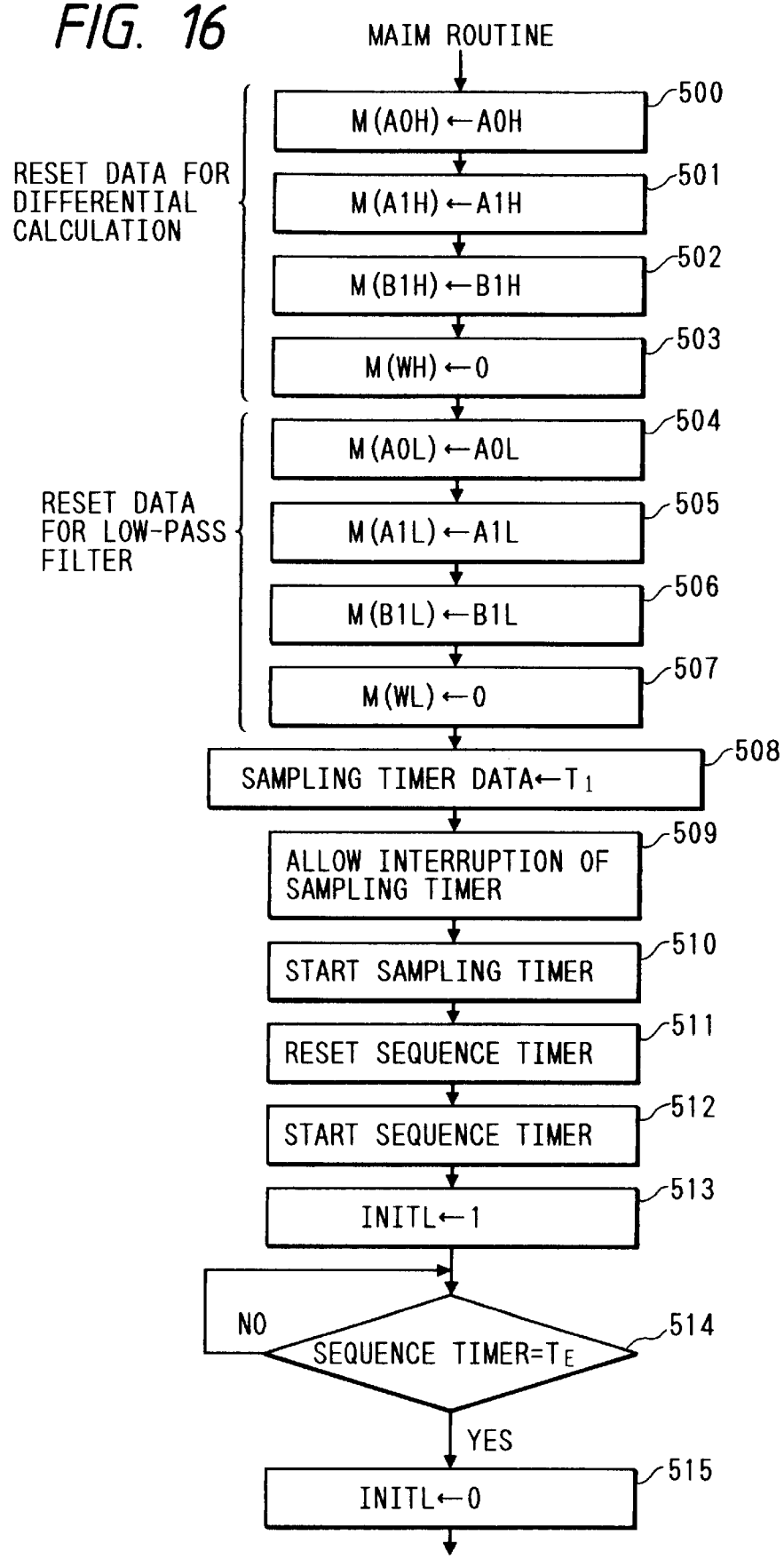
FIG. 16 is a flowchart showing an operation of a control circuit shown in FIG. 15.
Figure 17:
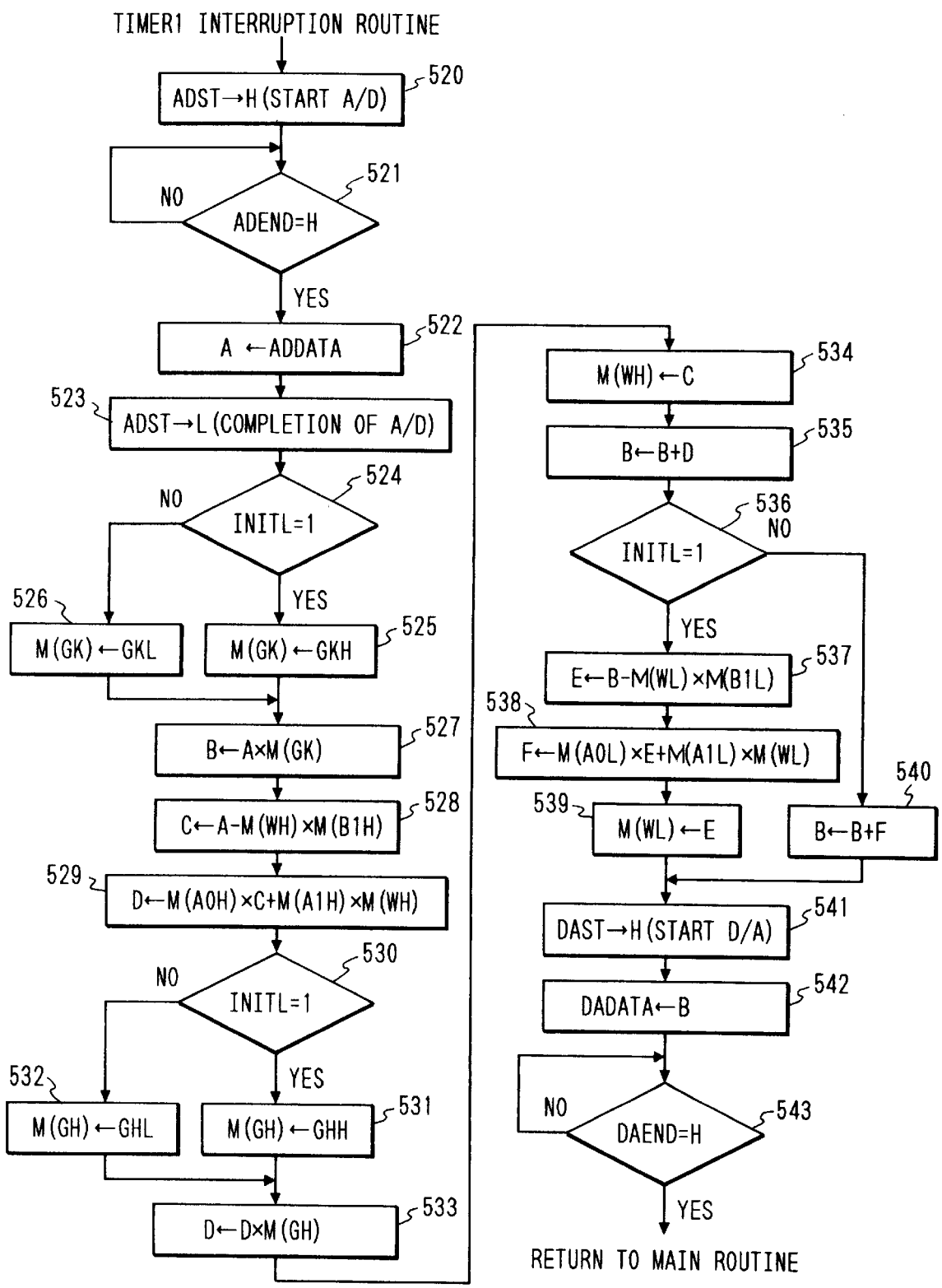
FIG. 17 is a flowchart showing the operation of the control circuit shown in FIG. 15.
Figure 18A:
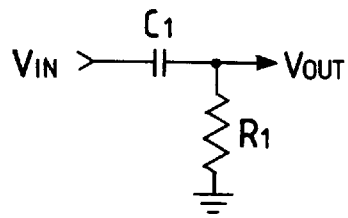
FIGS. 18A and 18B are views for explanation of the operation of the ninth embodiment of the present invention.
Figure 18B:
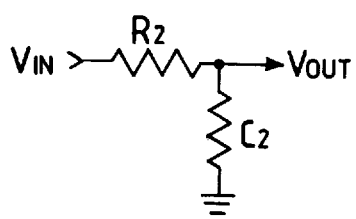
Figure 19:
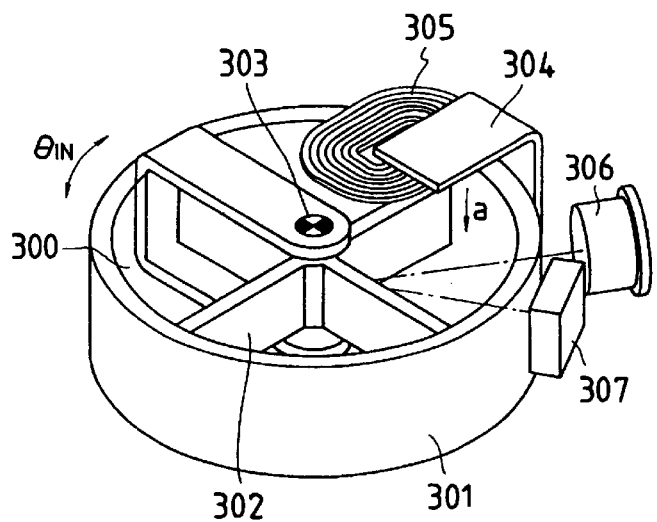
FIG. 19 is a perspective view showing an arrangement of an angular deviation sensor as a vibration detection means arranged in a conventional apparatus.
Figure 20A:
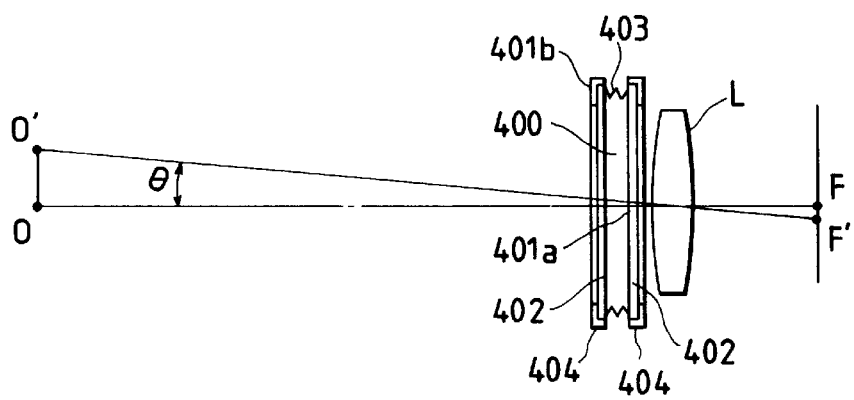
FIGS. 20A and 20B are views for explaining a variable vertical angle prism as an optical correction means arranged in the conventional apparatus.
Figure 20B:
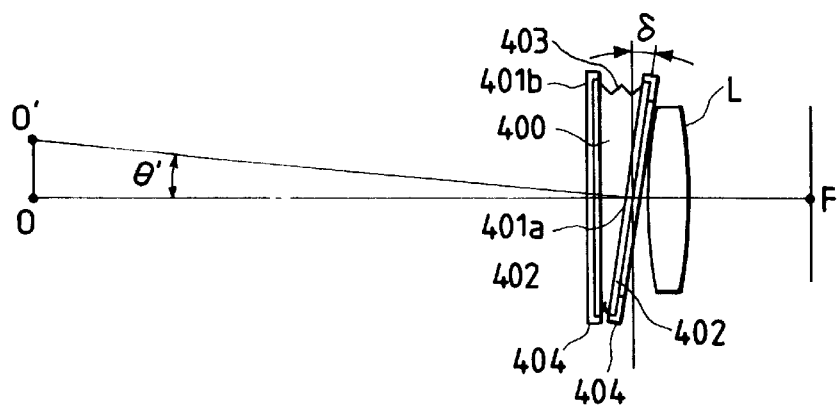

FIGS. 15 to 18 show the ninth embodiment of the present invention. FIG. 15 is a circuit diagram showing the overall arrangement, FIGS. 16 and 17 are flow charts, and FIGS. 18A and 18B are views for helping an explanation of the operation. Note that a position detection circuit portion and a driver circuit portion indicated by broken lines A and C in FIG. 15 are the same as those in FIG. 11, and a detailed description thereof will be omitted.

A portion indicated by a broken line B is a processing circuit for actually removing an offset generated by unbalance of an angular deviation sensor under digital control.

The operation of the processing circuit B will be described below with reference to flow charts shown in FIGS. 16 and 17. In steps 500 to 503, coefficients used upon execution of a digital differential calculation are respectively set in internal memories M(A0H), M(A1H), and M(B1H), and a memory M(WH) for storing a value calculated in the immediately preceding sampling and necessary for the digital calculation is initialized to "0". The coefficients used upon execution of the digital differential calculation are transformed into forms H(Z) on the Z plane using known S-Z transform (using bilinear transform in this case) on the basis of the frequency characteristics, given by the following equation, of a differential circuit shown in FIG. 18A:

$$H(S)=(SC1 \cdot R1)/(1+SC1 \cdot R1)$$

The coefficients can be expressed as follows using a sampling time interval T1:

$$A0H = \frac{\frac{2}{T1}}{\frac{1}{C1 \cdot R1} + \frac{2}{T1}} \quad (1)$$

$$A1H = \frac{-\frac{2}{T1}}{\frac{1}{C1 \cdot R1} + \frac{2}{T1}} \quad (2)$$

$$B1H = \frac{\frac{1}{C1 \cdot R1} - \frac{2}{T1}}{\frac{1}{C1 \cdot R1} + \frac{2}{T1}} \quad (3)$$

In steps 504 to 507, coefficients used upon execution of a low-pass filter calculation are respectively set in internal memories M(A0L), M(A1L), and M(B1L), and a memory M(WL) for storing a value calculated in the immediately preceding sampling and necessary for the digital calculation is initialized to "0". The coefficients used upon execution of the digital low-pass filter calculation are transformed into forms H(Z) on the Z plane using known S-Z transform on the basis of the frequency characteristics, given by the following equation, of a low-pass filter shown in FIG. 18B:

$$H(S)=1/(1+SC2 \cdot R2)$$

The coefficient values can be expressed as follows using the sampling time interval T1:

$$A0L = \frac{\frac{1}{C2 \cdot R2}}{\frac{1}{C2 \cdot R2} + \frac{2}{T1}} \quad (1)$$

$$A1L = \frac{\frac{1}{C2 \cdot R2}}{\frac{1}{C2 \cdot R2} + \frac{2}{T1}} \quad (2)$$

$$B1L = \frac{\frac{1}{C2 \cdot R2} - \frac{2}{T1}}{\frac{1}{C2 \cdot R2} + \frac{2}{T1}} \quad (3)$$

In step 508, time data T1 is set in a sampling timer 311 used for executing a digital calculation of the output value of the angular deviation sensor at the predetermined time intervals T1. In step 509, an interruption operation by the sampling timer 311 is allowed. In step 510, the sampling timer 311 is started.

In step 511, a sequence timer 314 for setting a time necessary for actually canceling a mechanical offset is reset. In step 512, the sequence timer 314 is started.

In step 513, a latch INITL in a control circuit 310 is set. In step 514, it is checked if the content of the sequence timer 314 has reached "TE". During a time interval until the content of the sequence timer 314 reaches "TE", digital control is executed in the interruption processing of the sampling timer 311. This operation will be described below with reference to the flowchart shown in FIG. 17.

In the main routine shown in FIG. 16, when the timer value of the sampling timer 311 reaches the predetermined value T1, the interruption operation is immediately started. In step 520 in FIG. 17, an output ADST from the control circuit 310 goes to H level to start an A/D conversion operation of an angular deviation sensor output (Va−Vb) by an A/D converter 312. In step 521, the state of an output ADEND indicating that the A/D conversion is ended is checked. If it is detected that the output ADEND goes to H level, the A/D-conversion result is set in an A register in the control circuit through a bus ADDATA in step 522. In step 523, the output ADST goes to L level, thus ending the A/D conversion. In step 524, the state of the latch INITL in the control circuit 310 is checked. If the latch INITL is set to be "1", gain data GKH is set in a memory M(GK) in step 525; if the latch INITL is reset to "0", gain data GKL is set in the memory M(GK) in step 526. The content of the memory M(GK) is used for determining a spring constant of the sensor when a coil is used, as has been described in the seventh embodiment. The gain data GKH has a larger value than that of the gain data GKL.

Therefore, in step 527, the content of the A register is multiplied with the content of the memory M(GK), and the product is set in a B register.

Steps 528 to 534 correspond to a differential calculation described in the seventh embodiment, i.e., a calculation processing portion for determining the viscous force of the sensor by the coil.

In step 528, the content of the memory M(WH) whose value ("0" after resetting) has already been determined at the immediately preceding sampling timing is multiplied with the content of the memory M(B1H) in which a constant is set in step 502 in FIG. 16, and the product is subtracted from the content of the A register set with the output value of the angular deviation sensor. The difference is set in a C register. In step 529, the product between the content of the C register, and the content of the memory M(A0H) in which a constant is set in step 500 is added to the product between the content of the memory M(WH) and the memory M(A1H) in which a constant is set in step 501, and the sum is set in a D register. At this time, the digitally differentiated result of the difference signal (Va−Vb) from the angular deviation sensor is set in the D register.

In step 530, the state of the latch INITL in the control circuit is checked like in step 524. If this latch is set to be "1", gain data GHH is set in the memory M(GH) in step 531; if it is reset to "0", gain data GHL is set in the memory M(GH) in step 532. The content of the memory M(GH) is used for determining the viscosity constant of the sensor when the coil is used like in the seventh embodiment. The gain data GHH has a larger value than that of the gain data GHL. In step 533, the content of the D register obtained in step 529 is multiplied with the content of the memory M(GH), and the product is set again in the D register. In step 534, the content of the C register necessary for the next sampling is set in the memory M(WH).

In step 535, the content of the B register in which the spring data corresponding to the spring force is set, as described above, is added to the content of the D register in which viscosity data corresponding to the viscous force is set, and the sum is set again in the B register. In step 536, the state of the latch INITL is checked. If this latch is set to be "1", a low-pass filter calculation for the content of the B register is executed in steps 537 to 539.

In step 537, the content of the memory M(WL) whose value ("0" after resetting) has already been determined at the immediately preceding sampling timing is multiplied with the content of the memory M(B1L) in which a constant is set in step 506 in FIG. 16, and the product is subtracted from the content of the B register. The difference is set in an E register. In step 538, the product between the content of the E register and the content of the memory M(A0L) in which a constant is set in step 504 is added to the product between the content of the memory M(WL) and the content of the memory M(A1L) in which a constant is set in step 505, and the sum is set in an F register. In step 539, the content of the E register necessary for the next sampling is set in the memory M(WL).

In this manner, in steps 537 to 539, the low-pass filter calculation is executed for coil spring data and viscosity data corresponding to the above-mentioned spring force and the viscous force, so as to remove the influence caused by a camera vibration by a photographer, and to calculate DC data for removing mechanical unbalance of the angular deviation sensor.

Therefore, while "1" is set in the latch INITL, an output DAST from the control circuit goes to H level in step 541 after the low-pass filter calculation. In step 542, the content of the B register is transferred to a D/A converter 313 via a bus DADATA, thus starting D/A conversion. Since the output value from the D/A converter 313 becomes a current value to a coil 204 through the driver circuit portion C, a float 202 in the angular deviation sensor stands still near the reference position by the strong spring force and viscous force. Upon completion of the D/A conversion, the D/A converter 313 sets its output DAEND at H level. The control circuit 310 detects this output value to end the timer interruption processing. The flow then returns to the main routine shown in FIG. 16.

Before the content of the sequence timer 314 reaches "TE", since "1" is kept set in the latch INITL, the above-mentioned operation is repeated every time an interruption is generated by the sampling timer 311.

If it is determined in step 514 that the sequence timer 314 has counted the predetermined time TE, the latch INITL is reset to "0" in step 515. In a state wherein the latch INITL is reset to "0", weak spring and viscosity constants are selected in steps 526 and 532, and spring and viscosity data in this state are set in the B register in step 535.

In step 536, since the latch INITL has been reset to "0", the flow advances to step 540, and the content of the F register, which stores a DC component corresponding to the sum of the spring and viscosity data when the strong spring and viscosity constants are selected in a state wherein the latch INITL is set, is added to the content of the B register, and the sum is set again in the B register. The content of the B register is output from the D/A converter 313 via steps 541 to 543, and becomes an output current to the coil 204 through the driver circuit portion C. Therefore, in this case, even when the spring and viscous force of the coil are restored to normal values of the angular deviation sensor, a reaction force against the gravity component caused by mechanical unbalance can be generated by supplying a DC current corresponding to the content of the F register.

According to the seventh to ninth embodiments, in order to eliminate the influence of a posture difference caused by mechanical unbalance in the angular deviation sensor used for stabilizing a camera vibration, the float in the angular deviation sensor is set in a detection range (reference position) of the sensor while very strong electrical spring and viscous forces generated by energizing the coil are set. Then, only DC components of the spring and viscous forces are extracted, and the spring and viscous forces are restored to original small values. At the same time, this offset force is set. For this reason, the influence of the posture difference of the angular deviation sensor can be quickly eliminated.

The above-mentioned mechanism will be described in detail below with reference to the seventh embodiment. That is, a direct output from the angular deviation sensor is added to a value obtained by differentiating the output once, and gains are switched according to the state of the control signal INIT. When the control signal INIT is at H level, the gains are increased to increase the electrical spring and viscous force, thereby immediately bringing the float to a position near the reference position. Then, values corresponding to the spring and viscous forces at that time are stored. After an elapse of a predetermined period of time, the control signal INIT is set at L level to restore the electrical spring and viscous forces to original values (so as to prevent low-frequency characteristics of the sensor from being deteriorated), and a DC value stored in the above-mentioned method is added as an offset. Therefore, an offset caused by mechanical unbalance in the angular deviation sensor can be electrically canceled, and the rising characteristics of the sensor can be improved. In addition, the stroke range of the sensor can be widened.

What is claimed is:

1. An image stabilizing apparatus comprising:
vibration detection means for detecting a vibration;
image stabilizing means for performing image stabilization according to an output from said vibration detection means, said image stabilizing means performing image stabilization by deflecting a light beam by moving an optical member arranged in an optical path;
deviation detection means for detecting a deviation of said optical member by said image stabilizing means;
control means for performing feedback control, so that the output from said vibration detection means and an output from said deviation detection means have a predetermined relationship therebetween;
gain setting means for setting a gain of at least one of the output from said vibration detection means and the output from said deviation detection means; and
gain switching means for, when the output from said vibration detection means and the output from said deviation detection means do not have said predetermined relationship therebetween, switching the gain set by said gain setting means.

2. An image stabilizing apparatus comprising:
vibration detection means for detecting a vibration;
image stabilizing means for performing image stabilization according to an output from said vibration detection means, said image stabilizing means performing image stabilization by deflecting a light beam by moving an optical member arranged in an optical path;
deviation detection means for detecting a deviation of said optical member by said image stabilizing means;
control means for performing feedback control, so that the output from said vibration detection means and an output from said deviation detection means have a predetermined relationship therebetween;
phase compensation means for performing phase compensation of at least one of the output from said vibration detection means and the output from said deviation detection means; and
phase compensation switching means for, when the output from said vibration detection means and the output from said deviation detection means do not have said predetermined relationship therebetween, switching said phase compensation means.

3. An image stabilizing apparatus comprising:

vibration detection means for detecting a vibration;

image stabilizing means for performing image stabilization according to an output from said vibration detection means, said image stabilizing means performing image stabilization by deflecting a light beam by moving an optical member arranged in an optical path;

deviation detection means for detecting a deviation of said optical member by said image stabilizing means;

control means for performing feedback control, so that the output from said vibration detection means and an output from said deviation detection means have a predetermined relationship therebetween;

gain setting means for setting a gain of at least one of the output from said vibration detection means and the output from said deviation detection means;

phase compensation means for performing phase compensation of at least one of the output from said vibration detection means and the output from said deviation detection means; and switching means for, when the output from said vibration detection means and the output from said deviation detection means do not have said predetermined relationship therebetween, switching at least one of said gain setting means and said phase compensation means.

4. A device adapted for use with an image blur prevention apparatus having an image blur prevention portion for preventing image blur, said device comprising:

a feedback loop for controlling an image blur prevention operation of the image blur prevention portion in response to an output of an image blur detection portion for detecting image blur and an output of a status detection portion for detecting a status of the image blur prevention portion; and a detection portion that detects an inappropriate status of said feedback loop, the inappropriate status being a status which may prevent a predetermined operation of said image blur prevention portion, said detection portion detecting that the inappropriate status exists when a signal which is unrelated to the output of the image blur detection portion and is also unrelated to the output of the status detection portion is included in a signal within the feedback loop.

5. A device according to claim 4, further comprising removing means for removing the inappropriate status in accordance with a detection by said detection portion.

6. A device according to claim 4, wherein said detection portion comprises means for detecting that the signal within the feedback loop includes a signal having a higher frequency component than a predetermined frequency.

7. A device according to claim 6, wherein said detection portion comprises means for detecting that an amplitude of the signal having the higher frequency component than the predetermined frequency is greater than or equal to a predetermined amplitude.

8. A device according to claim 5, wherein said removing means comprises means for varying a loop gain of the feedback loop.

9. A device according to claim 8, wherein said removing means comprises means for reducing the loop gain of the feedback loop.

10. A device according to claim 5, wherein said removing means comprises means for varying a phase compensation characteristic of the feedback loop.

11. A device according to claim 4, wherein the image blur prevention portion comprises a movable member, and the status detection portion comprises means for detecting a movement status of the movable member.

12. A device according to claim 11, wherein the image blur prevention portion comprises an optical member moving in an optical path, and the status detection portion comprises displacement status detection means for detecting a displacement status of the optical member.

13. A device according to claim 12, wherein the control portion comprises means for controlling a displacement of the image blur prevention portion based on a difference between the output of the image blur detection portion and an output of the displacement status detection portion.

14. A device according to claim 11, wherein said device further comprises the control portion.

15. A device according to claim 4, wherein the image blur detection portion comprises means for detecting a fluctuation of said device.

16. A device according to claim 4, wherein the image blur prevention portion comprises means for deflecting a light beam by moving into an optical path.

17. An image blur prevention apparatus comprising:

image blur prevention means for preventing image blur;

a feedback loop for controlling an image blur prevention operation of the image blur prevention means in response to an output of an image blur detection portion for detecting image blur and an output of a status detection portion for detecting a status of the image blur prevention portion; and detection means for detecting an inappropriate status of said feedback loop, the inappropriate status being a status which may prevent a predetermined operation of said image blur prevention portion, said detection means detecting that the inappropriate status exists when a signal which is unrelated to the output of the image blur detection portion and is also unrelated to the output of the status detection portion is included in a signal within the feedback loop.

18. An apparatus according to claim 17, further comprising removing means for removing the inappropriate status in accordance with a detection by said detection means.

19. An optical apparatus, comprising:

a feedback loop for controlling an image blur prevention operation of an image blur prevention portion in response to an output of an image blur detection portion for detecting image blur and an output of a status detection portion for detecting a status of the image blur prevention portion; and a detection portion that detects an inappropriate status of said feedback loop, the inappropriate status being a status which may prevent a predetermined operation of said image blur prevention portion, said detection portion detecting that the inappropriate status exists when a signal which is unrelated to the output of the image blur detection portion and is also unrelated to the output of the status detection portion is included in a signal within the feedback loop.

20. An equipment according to claim 19, further comprising removing means for removing the inappropriate status in accordance with a detection by said detection portion.

21. A device adapted for use with an image blur prevention apparatus having an image blur prevention portion for preventing image blur, said device comprising:

a feedback loop for controlling an image blur prevention operation of the image blur prevention portion; and a determination portion for determining whether the feedback loop is in an oscillating condition.

22. An apparatus according to claim 21, wherein the feedback loop comprises means for controlling the operation of the image blur prevention portion in accordance with an output of an image blur detection portion for detecting an image blur status.

23. An apparatus according to claim 21, wherein the feedback loop comprises means for controlling the operation of the image blur prevention portion in accordance with an output of a status detection portion for detecting a status of the image blur prevention portion.

24. An apparatus according to claim 23, wherein the image blur prevention portion comprises a movable member, and the status detection portion comprises means for detecting a movement status of the movable member.

25. An apparatus according to claim 23, wherein the feedback loop comprises means for controlling the operation of the image blur prevention portion in accordance with the output of the status detection portion and an output of an image blur detection portion for detecting an image blur status.

26. An apparatus according to claim 21, wherein said determination portion comprises means for determining that the oscillating condition is occurring in accordance with a frequency characteristic of a signal in the feedback loop.

27. An apparatus according to claim 26, wherein said detection portion comprises means for detecting that the signal within the feedback loop includes a signal having a higher frequency component than a predetermined frequency.

28. An apparatus according to claim 21, wherein said determination portion comprises means for determining that the oscillating condition is occurring in accordance with an amplitude of a signal in the feedback loop.

29. An apparatus according to claim 21, further comprising eliminating means for eliminating the oscillating condition if the determination portion determines that the oscillating condition is occurring in the feedback loop.

30. An apparatus according to claim 29, wherein said eliminating means comprises means for eliminating the oscillating condition by changing a loop gain of the feedback loop.

31. An apparatus according to claim 29, wherein said eliminating means comprises means for eliminating the oscillating condition by changing a phase compensation characteristic of the feedback loop.

32. An image blur prevention apparatus comprising:
image blur prevention means for preventing image blur;
a feedback loop for controlling an image blur prevention operation of the image blur prevention means in response to an output of an image blur detection portion for detecting image blur; and
a determination portion for determining whether the feedback loop is in an oscillating condition.

33. An optical apparatus having a feedback loop for controlling an image blur prevention operation of an image blur prevention portion in response to output of an image blur detection portion, said optical apparatus comprising:
a determination portion for determining whether the feedback loop is in an oscillating condition.

34. A device adapted for use with an image blur prevention apparatus having an image blur prevention portion for preventing image blur, said device comprising:
a feedback loop for controlling an image blur prevention operation of the image blur prevention portion in accordance with an output of a signal output means for outputting a predetermined signal;
determination means for determining a status of the feedback loop; and
changing means for changing at least one of a gain of the signal of the signal output means and a phase compensation characteristic of the feedback loop in accordance with a determination by said determination means.

35. A device according to claim 34, wherein the feedback loop comprises means for controlling the operation of the image blur prevention portion in accordance with an output of an image blur detection portion for detecting an image blur status, and said changing means comprises means for changing at least one of a gain of the output of the image blur detection portion and the phase compensation characteristic.

36. A device according to claim 34, wherein the feedback loop controls the operation of the image blur prevention portion in accordance with an output of a status detection portion for detecting a status of the image blur prevention portion, and said changing means comprises means for changing at least one of a gain of the output of the status detection portion and the phase compensation characteristic.

37. A device according to claim 34, wherein said determination means comprises means for determining whether an oscillating condition is occurring in the feedback loop.

38. An image blur prevention apparatus adapted for use with an image blur prevention apparatus having an image blur prevention portion for preventing image blur and a feedback loop for controlling an image blur and a feedback loop for controlling an image blur prevention operation of the image blur prevention portion in accordance with an output of signal output means for outputting a predetermined signal, the device comprising:
determination means for determining a status of the feedback loop; and
changing means for changing at least one of a gain of the signal of the signal output means and a phase compensation characteristic of the feedback loop in accordance with a determination by said determination means.

39. An optical apparatus adapted for use with an image blur prevention apparatus having an image blur prevention portion for preventing image blur and a feedback loop for controlling an image blur prevention operation of the image blur prevention portion in accordance with an output of signal output means for outputting a predetermined signal, the optical apparatus comprising:
determination means for determining a status of the feedback loop; and
changing means for changing at least one of a gain of the signal of the signal output means and a phase compensation characteristic of the feedback loop in accordance with a determination by said determination means.

* * * * *

UNITED STATES PATENT AND TRADEMARK OFFICE
CERTIFICATE OF CORRECTION

PATENT NO. : 5,873,004
DATED : February 16, 1999
INVENTOR(S) : YASUHIKO SHIOMI

It is certified that error appears in the above-identified patent and that said Letters Patent is hereby corrected as shown below:

Column 1

Line 39, " "$\theta^{IN}$" " should read --"$\theta_{IN}$"--.

Column 2

Line 15, "$\theta$" should read --$\theta'$--.

Column 12

Line 25, "out put" should read --output--.

Signed and Sealed this

Twelfth Day of October, 1999

Attest:

Q. TODD DICKINSON

*Attesting Officer*  *Acting Commissioner of Patents and Trademarks*